(12) United States Patent
Purkayastha et al.

(10) Patent No.: US 11,533,594 B2
(45) Date of Patent: Dec. 20, 2022

(54) ENHANCED NEF FUNCTION, MEC AND 5G INTEGRATION

(71) Applicant: Sony Corporation, Tokyo (JP)

(72) Inventors: Debashish Purkayastha, Collegeville, PA (US); Michelle Perras, Montéal (CA); Robert G. Gazda, Spring City, PA (US)

(73) Assignee: SONY CORPORATION, Tokyo (JP)

( * ) Notice: Subject to any disclaimer, the term of this patent is extended or adjusted under 35 U.S.C. 154(b) by 275 days.

(21) Appl. No.: 16/771,152

(22) PCT Filed: Dec. 17, 2018

(86) PCT No.: PCT/US2018/065968
§ 371 (c)(1),
(2) Date: Jun. 9, 2020

(87) PCT Pub. No.: WO2019/118964
PCT Pub. Date: Jun. 20, 2019

(65) Prior Publication Data
US 2021/0176613 A1 Jun. 10, 2021

Related U.S. Application Data

(60) Provisional application No. 62/599,335, filed on Dec. 15, 2017.

(51) Int. Cl.
*H04W 4/50* (2018.01)
*H04L 67/10* (2022.01)
*H04W 84/04* (2009.01)

(52) U.S. Cl.
CPC .............. *H04W 4/50* (2018.02); *H04L 67/10* (2013.01); *H04W 84/042* (2013.01)

(58) Field of Classification Search
CPC .......... H04J 11/00; H04B 17/345; H04L 5/00; H04W 72/12; H04W 56/00; H04W 24/10; H04W 28/02
See application file for complete search history.

(56) References Cited

U.S. PATENT DOCUMENTS

2016/0132875 A1* 5/2016 Blanco ................. G06Q 20/047
705/44
2017/0126618 A1 5/2017 Bhaskaran et al.
(Continued)

FOREIGN PATENT DOCUMENTS

| CN | 101557575 A | 10/2009 |
|---|---|---|
| CN | 102149084 A | 8/2011 |

(Continued)

OTHER PUBLICATIONS

Ericsson, "TS 23.501: NEF Functionality," SA WG2 Meeting #S2-124, S2-179116, Reno, Nevada, USA (Nov. 27-Dec. 1, 2017).
(Continued)

*Primary Examiner* — Iqbal Zaidi
(74) *Attorney, Agent, or Firm* — Xsensus LLP

(57) ABSTRACT

Methods, devices, and systems for third party edge cloud service providers (CSPs) to provide edge computing services to network service providers. The edge computing service is initialized in a network. Network information services of the network are discovered. A location of a cloud resource in the network may be dynamically changed. User plane traffic is steered toward the location of the cloud resource. In some embodiments, initializing the edge computing service includes transmitting an identity of a valid user and a data network name to a network function virtualization management and organization system, or transmitting a user subscription list to a network exposure function. In some embodiments, dynamically changing the location of a cloud resource and steering user plane traffic toward the (Continued)

location of the cloud resource includes determining a number of users of an edge application at a location, and a network requirement of the edge application.

18 Claims, 23 Drawing Sheets

(56) References Cited

U.S. PATENT DOCUMENTS

| | | | |
|---|---|---|---|
| 2017/0317894 | A1 | 11/2017 | Dao et al. |
| 2018/0146037 | A1* | 5/2018 | Figueroa ............. H04L 67/1097 |
| 2019/0149365 | A1* | 5/2019 | Chatterjee ............. H04L 5/0044 370/329 |
| 2019/0373441 | A1 | 12/2019 | Ryu et al. |

FOREIGN PATENT DOCUMENTS

| | | |
|---|---|---|
| CN | 102170626 A | 8/2011 |
| CN | 102223729 A | 10/2011 |
| CN | 103327566 A | 9/2013 |
| CN | 104883736 A | 9/2015 |
| CN | 106851856 A | 6/2017 |
| CN | 107005965 A | 8/2017 |
| CN | 107743307 | 2/2018 |
| WO | 2017/192791 | 11/2017 |
| WO | 2018/129807 | 7/2018 |

OTHER PUBLICATIONS

European Telecommunications Standards Institute, "Mobile Edge Computing (MEC) Framework and Reference Architecture," ETSI GS MEC 003 (V1.1.1).
Huawei et al., "Application-friendly UP Management," 3GPP TSG SA WG2 Meeting #, S2-170370 (Jan. 2017).
Huawei et al., "TS 23.502: AF influenced PDU session establishment and DN authentication/authorization via NEF,"3GPP TSG SAWG2 Meeting #123, S2-177384, Ljubljana, Slovenia (Oct. 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11 ah-2016 (Dec. 7, 2016).
Kekki et al., "MEC in 5G networks," ETSI White Paper No. 28 (Jun. 2018).
Nokia et al., "Pseudo-CR on Requirements for Session Management procedures and services," 3GPP TSG CT4 Meeting #79, C4-174244, Krakow, Poland (Aug. 21-27, 2017).
Patel et al., "Mobile-Edge Computing," Introductory Technical White Paper, pp. 1-36 (Sep. 2014).
Third Generation Partnership Project, "Technical Specification Group Services and System Aspects; Architecture enhancements to facilitate communications with packet data networks and applications (Release 15)," 3GPP TS 23.682 V15.2.0 (Sep. 2017).
Third Generation Partnership Project, "Technical Specification Group Services and System Aspects; Architecture enhancements to facilitate communications with packet data networks and applications (Release 15)," 3GPP TS 23.682 V15.6.0 (Sep. 2018).
Third Generation Partnership Project, "Technical Specification Group Services and System Aspects; Architecture enhancements to facilitate communications with packet data networks and applications (Release 16)," 3GPP TS 23.682 V16.0.0 (Sep. 2018).
Third Generation Partnership Project, "Technical Specification Group Services and System Aspects; Study on Common API Framework for 3GPP Northbound APIs (Release 15)," 3GPP TR 23.722 V15.1.0 (Apr. 2018).
Third Generation Partnership Project, "Technical Specification Group Services and System Aspects; Study on Common API Framework for 3GPP Northbound APIs (Release 15)," 3GPP TR 23.722 V2.0.0 (Dec. 2017).
Third Generation Partnership Project, "Technical Specification Group Services and System Aspects; System Architecture for the 5G System; Stage 2 (Release 15)," 3GPP TS 23.501 V1.6.0 (Dec. 2017).
Third Generation Partnership Project, "Technical Specification Group Services and System Aspects; System Architecture for the 5G System; Stage 2 (Release 15)," 3GPP TS 23.501 V15.3.0 (Sep. 2018).
Third Generation Partnership Project, "Technical Specification Group Core Network and Terminals; 5G System; Common Data Types for Service Based Interfaces; Stage 3 (Release 15)," 3GPP TS 29.571 V15.1.0 (Sep. 2018).
Third Generation Partnership Project, "Technical Specification Group Core Network and Terminals; 5G System; Common Data Types for Service Based Interfaces Stage 3 (Release 15)," 3GPP TS 29.571 V0.3.0 (Dec. 2017).
Third Generation Partnership Project, "Technical Specification Group Core Network and Terminals; 5G System; Network Exposure Function Northbound APIs; Stage 3 (Release 15)," 3GPP TS 29.522 V15.1.0 (Sep. 2018).
Third Generation Partnership Project, "Technical Specification Group Services and System Aspects; MBMS Extensions for Provisioning and Content Ingestion (Release 15)," 3GPP TR 26.981 V15.0.0 (Jun. 2018).
Third Generation Partnership Project, "Technical Specification Group Services and System Aspects; MBMS Extensions for Provisioning and Content Ingestion (Release 14)," 3GPP TR 26.981 V14.0.0 (Mar. 2017).
Third Generation Partnership Project, "Technical Specification Group Services and System Aspects; Procedures for the 5G System; Stage 2 (Release 15)," 3GPP TS 23.502 V1.3.0 (Nov. 2017).
Third Generation Partnership Project, "Technical Specification Group Services and System Aspects; Procedures for the 5G System; Stage 2 (Release 15)," 3GPP TS 23.502 V15.3.0 (Sep. 2018).

* cited by examiner

ENHANCED NEF FUNCTION, MEC AND 5G INTEGRATION

CROSS REFERENCE TO RELATED APPLICATIONS

This application is the U.S. National Stage, under 35 U.S.C. § 371, of International Application No. PCT/US2018/065968 filed Dec. 17, 2018, which claims the benefit of U.S. Provisional Application No. 62/599,335 filed Dec. 15, 2017, the content of which are hereby incorporated by reference herein.

BACKGROUND

Mobile Edge Computing (MEC) is an emerging technology that may enable service and content providers to offer their applications and services on the edge of the network, rather than utilizing applications in data centers, reaching over the core network. 3GPP 5G Service Based Architecture describes a service function called the Network Exposure Function (NEF), which exposes network services to Application Functions. These Application Functions may be owned by Network Operators or Trusted Third Party Service Providers.

SUMMARY

Some embodiments provide methods, devices, and systems for any edge computing service provider, such as a third party service provider or network operator, to provide edge computing service to network service providers or network operators. The edge computing service is initialized in a network. Network information services of the network are discovered. The location of cloud resources where Mobile Edge Applications (MEA) can run may be dynamically changed or configured. For example, user plane traffic may be steered toward the location of the cloud resource.

In some embodiments, initializing the edge computing service includes transmitting an identity of a valid user and a data network name (DNN) to a network function virtualization (NFV) management and organization (MANO) system, or transmitting a user subscription list to a network exposure function (NEF).

In some embodiments, discovering network information includes monitoring the location of a user and/or network conditions and/or obtaining network information services from a network operator. In some embodiments, dynamically changing the location of a cloud resource and steering user plane traffic toward the location of the cloud resource includes determining a number of users of an edge application at a location and a bandwidth and/or latency requirement of the edge application. In some embodiments, dynamically changing the location of a cloud resource where MEA can run and steering user plane traffic toward the location of the cloud resource includes transmitting a message to a network exposure function (NEF) to update the user plane. In some embodiments, the message to the NEF to update the user plane includes an application identity, user identity, and a data network name (DNN).

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
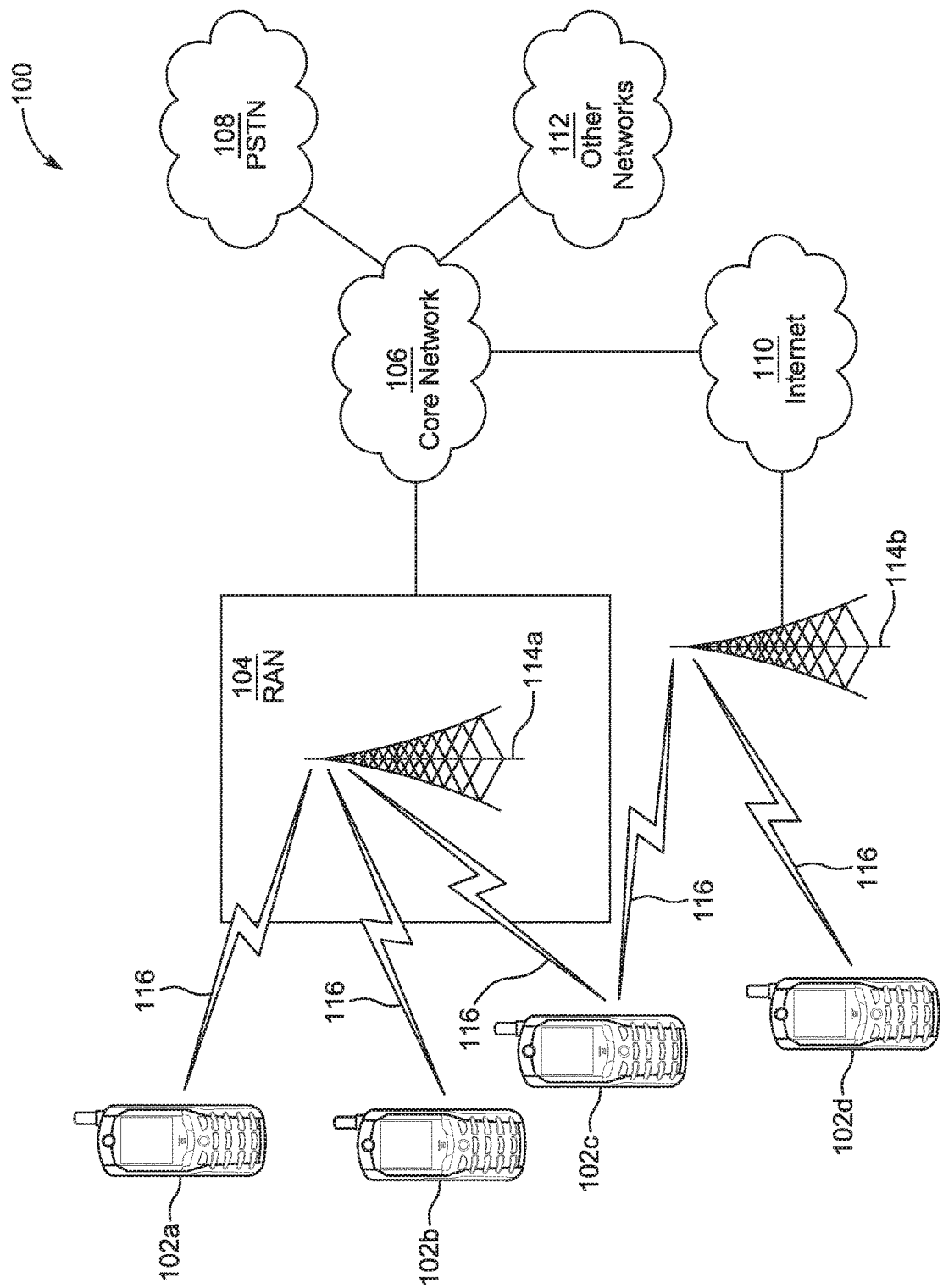
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
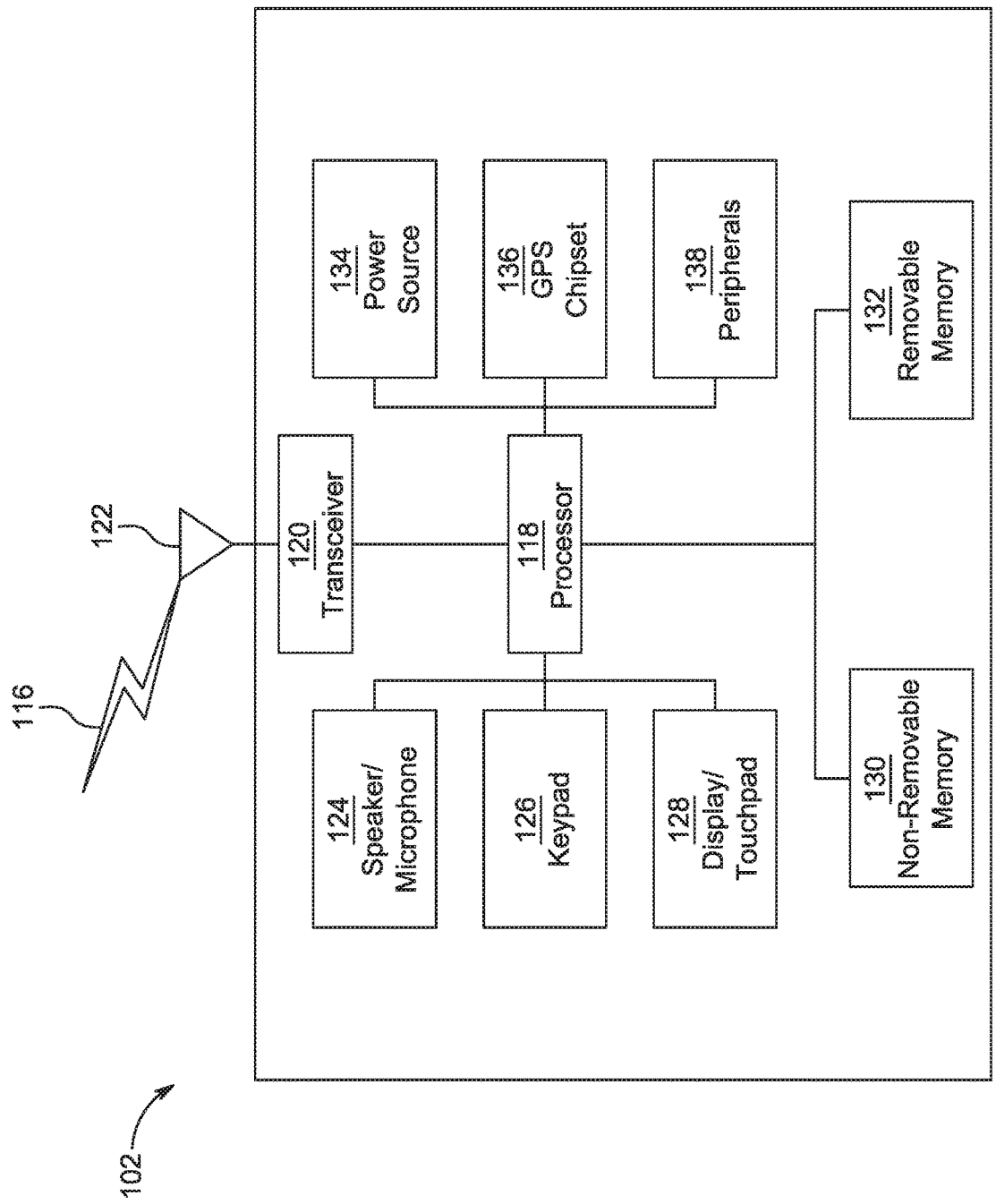
FIG. 1B is a system diagram illustrating an example wireless transmit/receive unit (WTRU) that may be used within the communications system illustrated in FIG. 1A according to an embodiment.
Figure 1C:
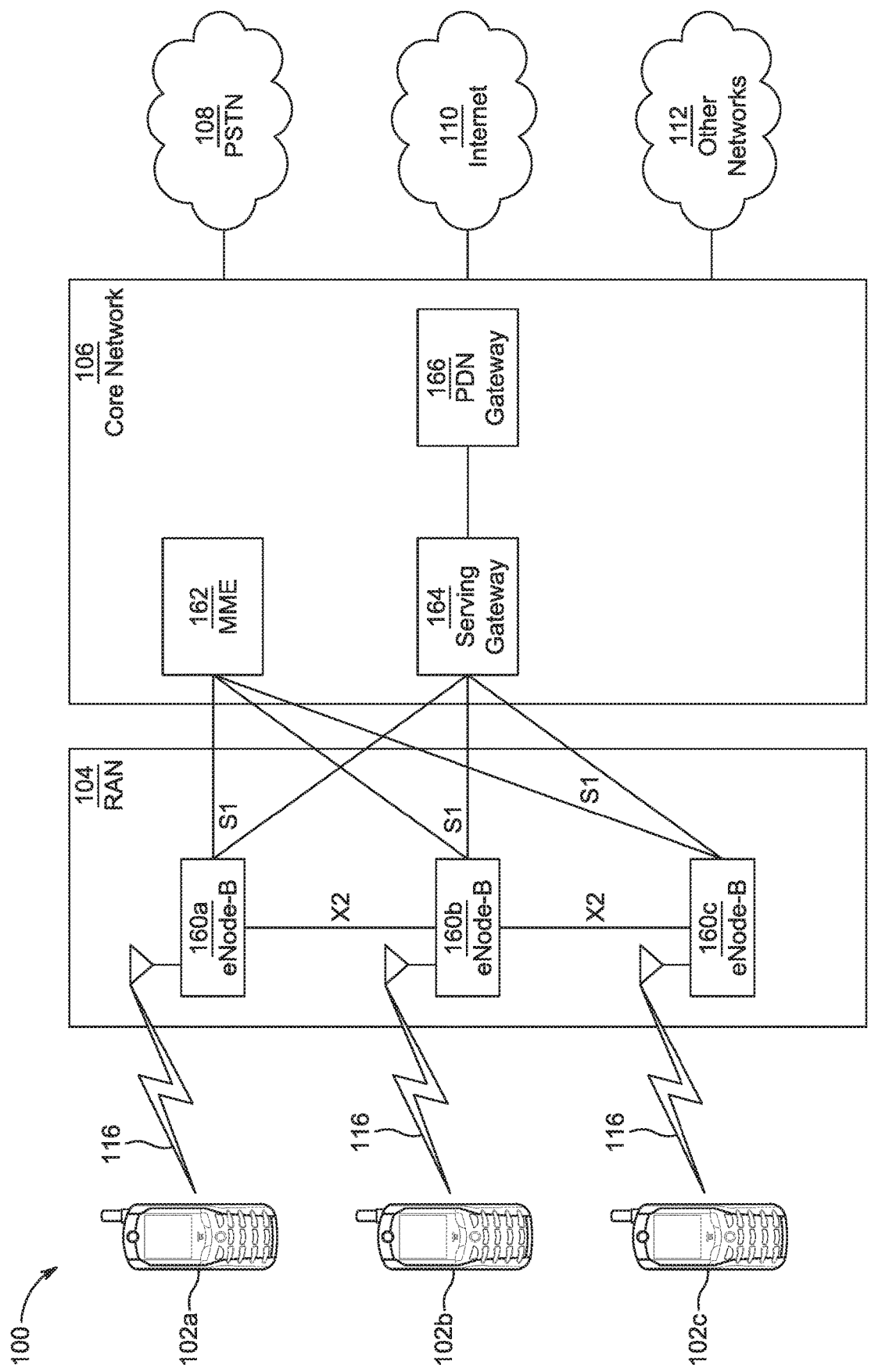
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
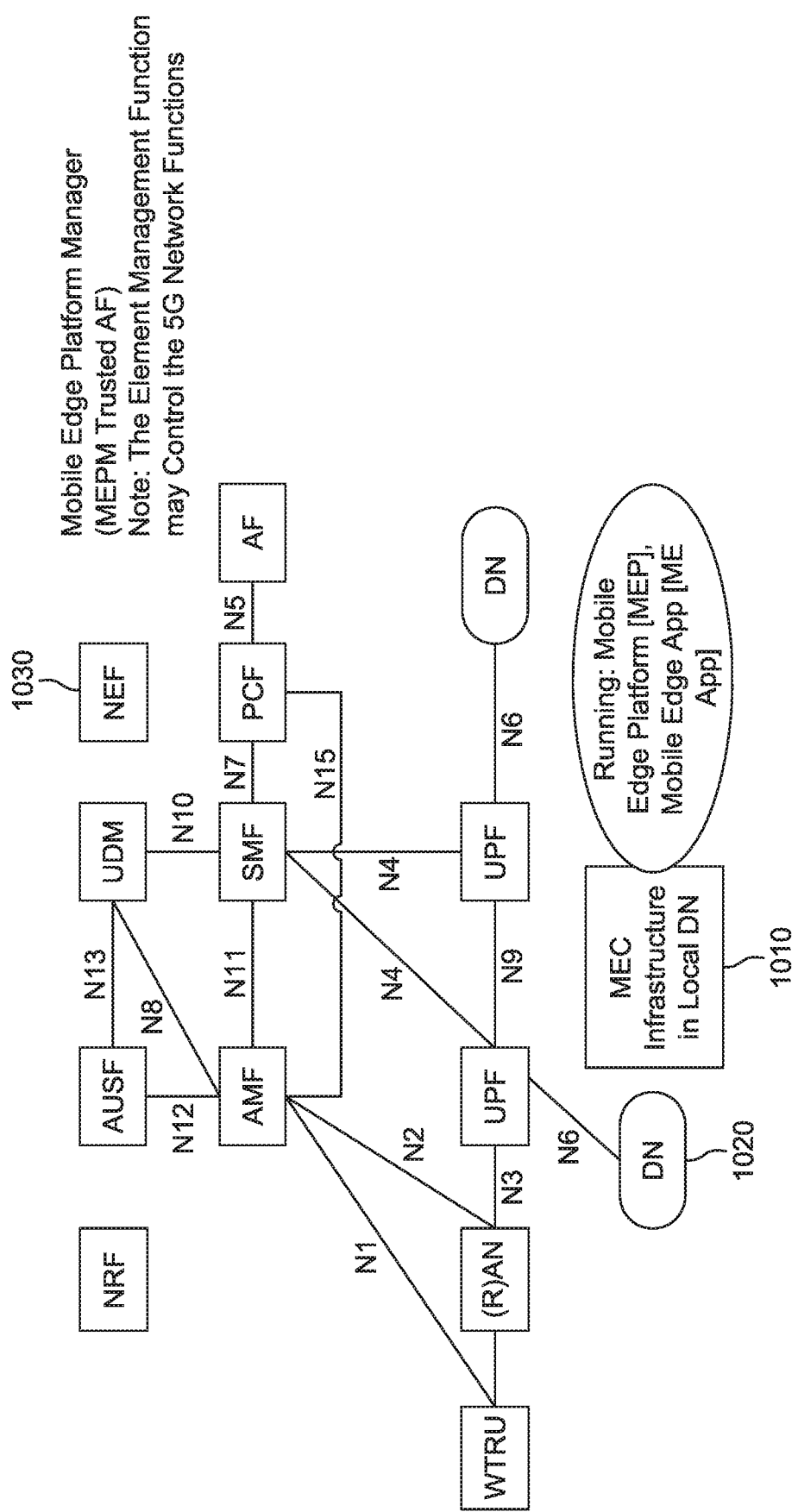
FIG. 10 is a system diagram showing example logical architecture for MEC and 5G system integration.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
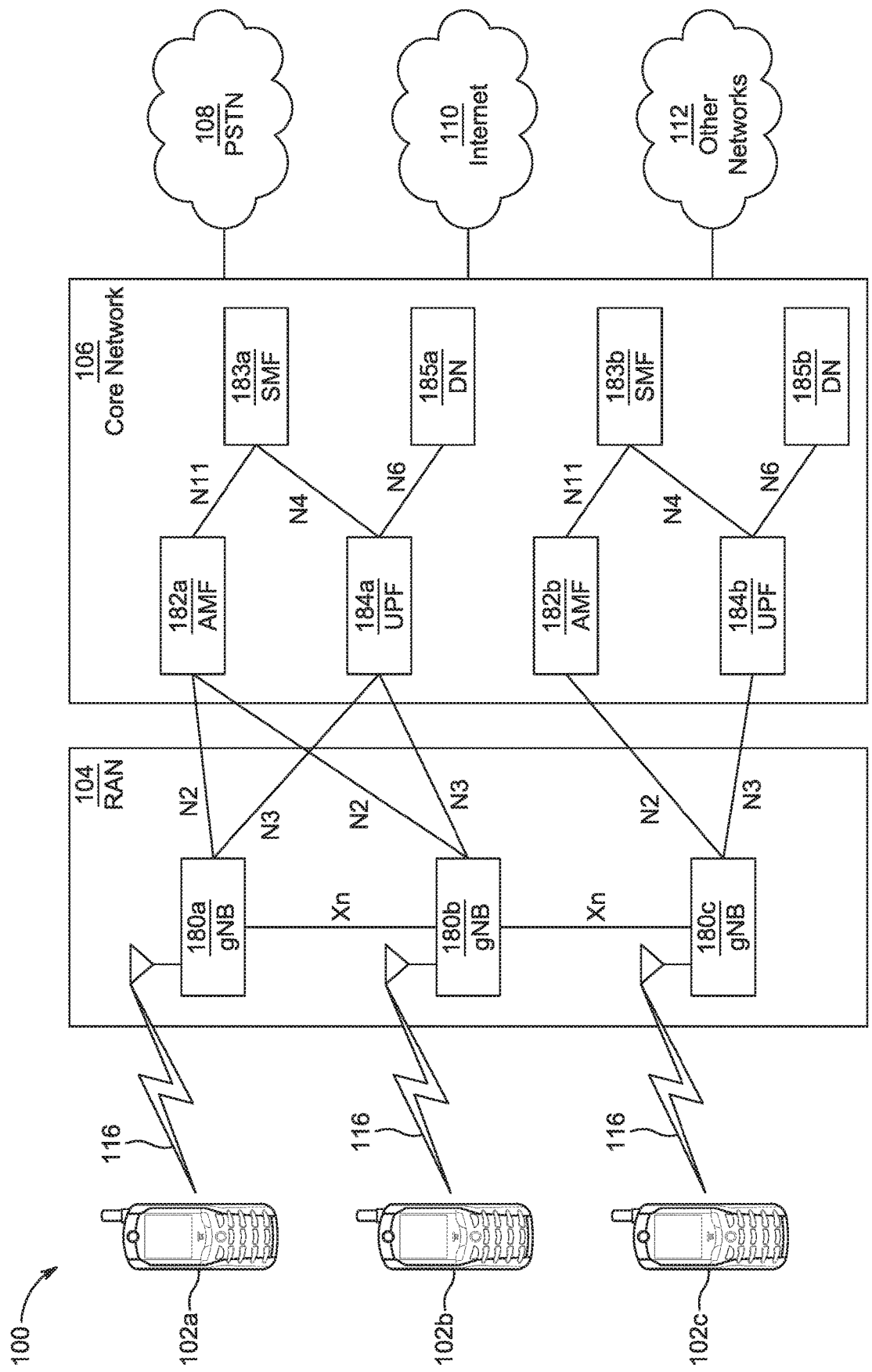
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

5G wireless networks are currently under development with the objective of establishing a unified connectivity framework that extends the capabilities of Human Type Communication (HTC) and allows the interconnection of Machine Type Communication (MTC) from machines such as vehicles, robots, IoT sensors and actuators, and other industrial equipment. This unified framework may enable future industry-driven applications by supporting HTC and industry-grade MTC traffic of mixed priorities. Although there is significant uncertainty about what the final 5G framework will be, some of its features may include low latency, proximity services, context awareness, and mobile edge computing (MEC).

For example, breakthroughs in medium access and advanced waveform technologies combined with novel coding and modulation schemes are expected to provide 5G networks with transmission latencies of less than 1 ms, which may be referred to as low latency. 5G systems may enable devices to communicate directly with other devices in the proximity in a Device-to-Device (D2D) fashion through a direct local link. The 5G network may be context aware. For example, the network may be expected to be aware (e.g., continuously) of the individual location and features of a given device and may be expected to possess information regarding its surroundings and environment. MEC is an emerging technology which may enable service and content providers to offer their applications and services on the edge of the network, rather than utilizing the core network. In other words, in a MEC system, application and service deployment may be enabled through a cloud like environment at the edge of the mobile network. This concept may reduce latency and may avoid congesting the backbone network, e.g. the core network, by restricting traffic to the geographical location(s) of the subscribers.

MEC may play a role in realizing a 5G vision. For example, MEC may help in meeting critical 5G requirements such as latency, bandwidth, context awareness, etc. Hooks (e.g., initial framework) may be introduced in 5G to integrate MEC, such as the UPF, branching UPF, etc. Network functions may be defined, like the Network Exposure Function (NEF), to expose or provide network services, and/or Application Functions (AFs), and to extend networks with non-3GPP services.

Various devices, systems, and methods may be employed to integrate MEC within a 3GPP defined 5G network.

Figure 2:
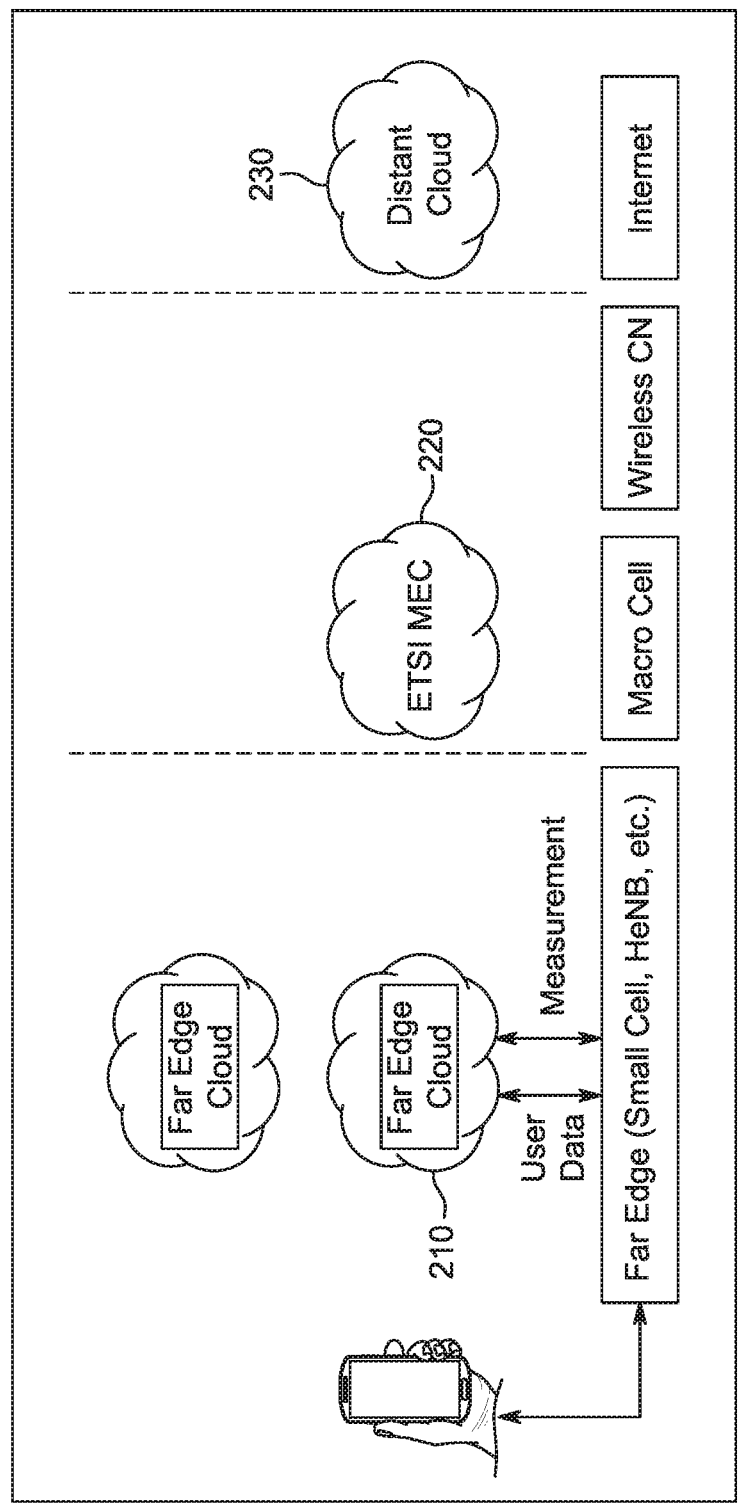
FIG. 2 is a system diagram which illustrates aspects of a Far Edge Cloud.

FIG. 2 is a system diagram which illustrates aspects of a Far Edge Cloud and where it is situated with respect to other parts of a network. A Far Edge Cloud may include a cloud formed of any one of or a combination of small cells, WiFi AP, HeNB, set top boxes, HetNet gateways, in-home media gateways, etc. A Far Edge Cloud 210 may be formed at the far edge of the network outside of managed data centers, beyond a cloud 220 as defined by the European Telecommunication Standards Institute (ETSI) MEC. A Far Edge Cloud may provide services independently or in collaboration with an MEC/Distant cloud 230. By virtue of the resources available to a Far Edge Cloud, it may be limited in terms of computing power, storage, and network connectivity. On the other hand, by being relatively closer to the end user, a Far Edge Cloud may have the advantage of being able to respond with lower latency.

5G and Edge computing may give rise to new business models. Real estate owners such as shopping mall and tower companies may generate additional revenue by housing small data centers within their real estate and may provide edge computing services to wireless service providers. Such players may follow an Infrastructure as a Service (IaaS) model, and may manage hardware and networking resources. Such players may extend their business model by expanding to a Platform as a Service (PaaS) model. The PaaS model may allow application developers to install Edge applications. In this way, real estate owners may have the presence and capacity to use and generate additional revenue. On the other hand mobile network operators (MNOs) may be able to avoid installing, managing data centers and may take advantage of edge computing to improve customer experience. MNOs may charge a premium to the end users for using edge computing services.

Irrespective of whether an IaaS or PaaS model is used, a standardized interface between mobile network and edge computing service provider, such as Trusted Third Party Cloud Service Provider may be desired.

Figure 3:
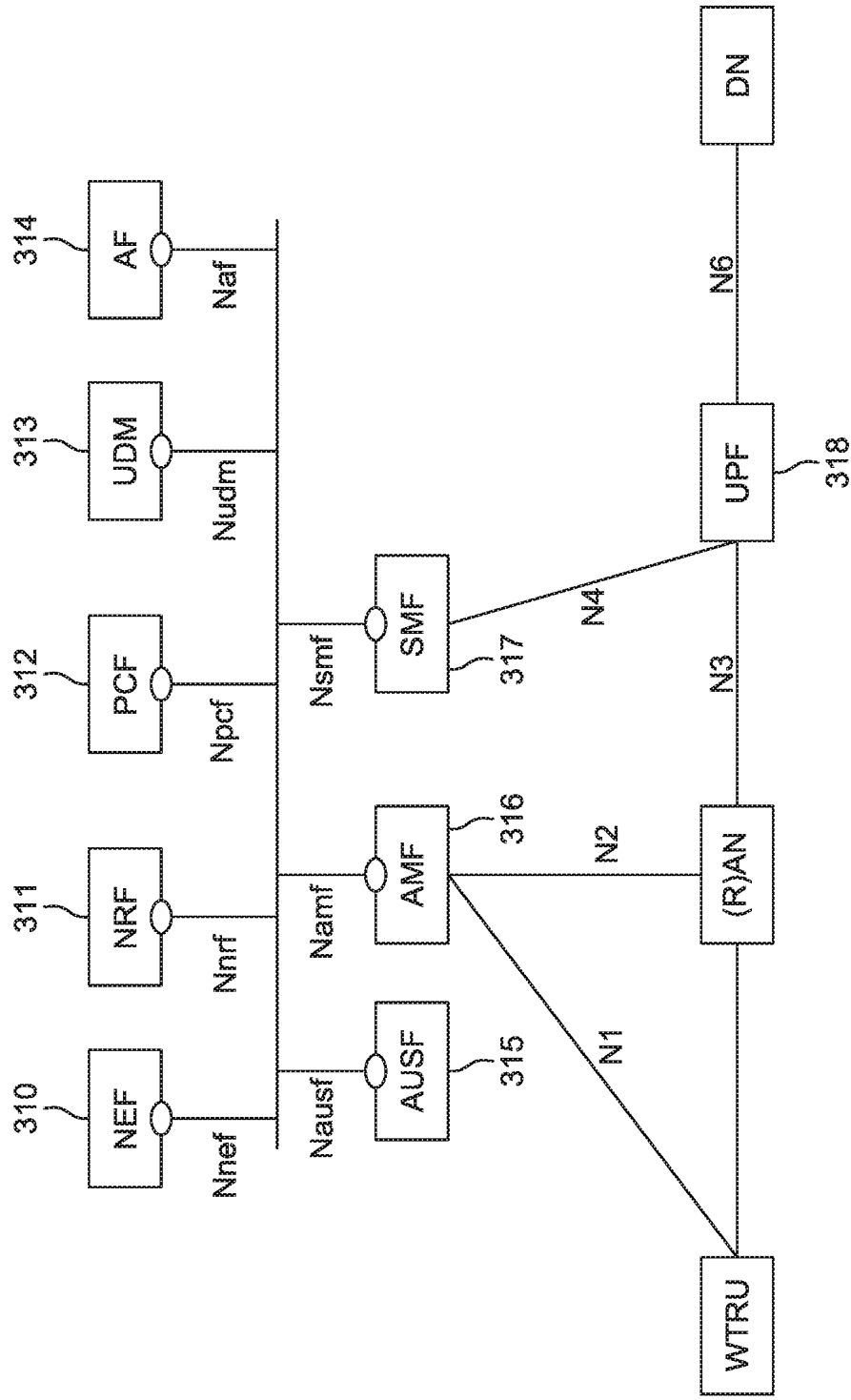
FIG. 3 is a system diagram showing an example service based architecture.

FIG. 3 is a system diagram showing an example service-based architecture. In this example, all functions expose a service application programming interface (API), which can be used by other functions. The architecture includes a Network Exposure Function (NEF) 310, a network repository function (NRF) 311, a policy control function (PCF) 312, a unified data management function (UDM) 313, an application function (AF) 314, an authentication server function (AUSF) 315, a core access and mobility management function (AMF) 316, a session management function (SMF) 317, and a user plane function (UPF) 318. Various implementations may include one, some, or all of these functions, or variations thereof.

In the example of FIG. 3, the NEF 310 provides secure exposure of the services and capabilities provided by 3GPP network functions for e.g., Application Functions, Edge Computing, etc. The NRF 311 provides a repository function that affords registration and discovery functionality for other network functions. The PCF 312 provides a policy control function that incorporates network slicing, roaming, and mobility management. The UDM 313 is responsible for storing authentication and access authorization credentials. The AF 314 interacts with the 3GPP Core Network in order to provide services, to facilitate application influence on traffic routing, access network capability exposure, and interaction with the policy framework for policy control. The AUSF 315 provides an authentication server function. The AMF 316 provides a core access and mobility function. The SMF 317 provides session establishment, modification and release, and tunnel maintenance between the UPF and the AN node, selection and control of the UPF 318, and configures traffic steering at the UPF 318 to route traffic to proper destination. The UPF 318 provides an anchor point for Intra/Inter-RAT mobility, an external PDU session point of interconnect data, and network packet routing & forwarding.

Figure 4:
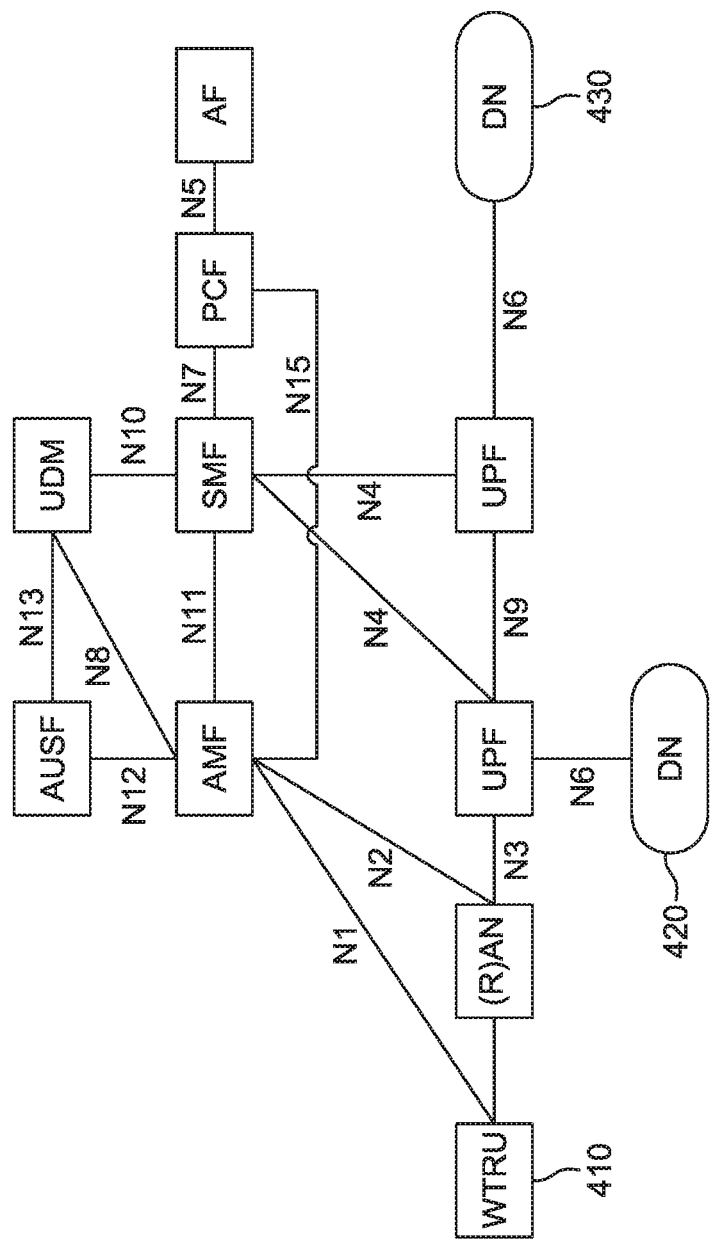
FIG. 4 is a system diagram illustrating an example non-roaming 5G system architecture.

A 5G system architecture can be represented using reference points. FIG. 4 is a system diagram illustrating an example non-roaming 5G system architecture for concurrent access to two (e.g., local and central) data networks. In the example provided, a WTRU 410 may gain access to both DNs 420 and 430 by establishing a single PDU session. The reference points represent interactions standardized by 3GPP. These interactions may use the APIs exposed by service functions.

Example principles of edge computing in 5G include the 5G core network selecting a UPF close to the WTRU and executing traffic steering from the UPF to the local data network via an N6 interface. Due to user or application function mobility, service or session continuity may be required. Network information and capabilities may be exposed to an edge computing application.

Figure 5:
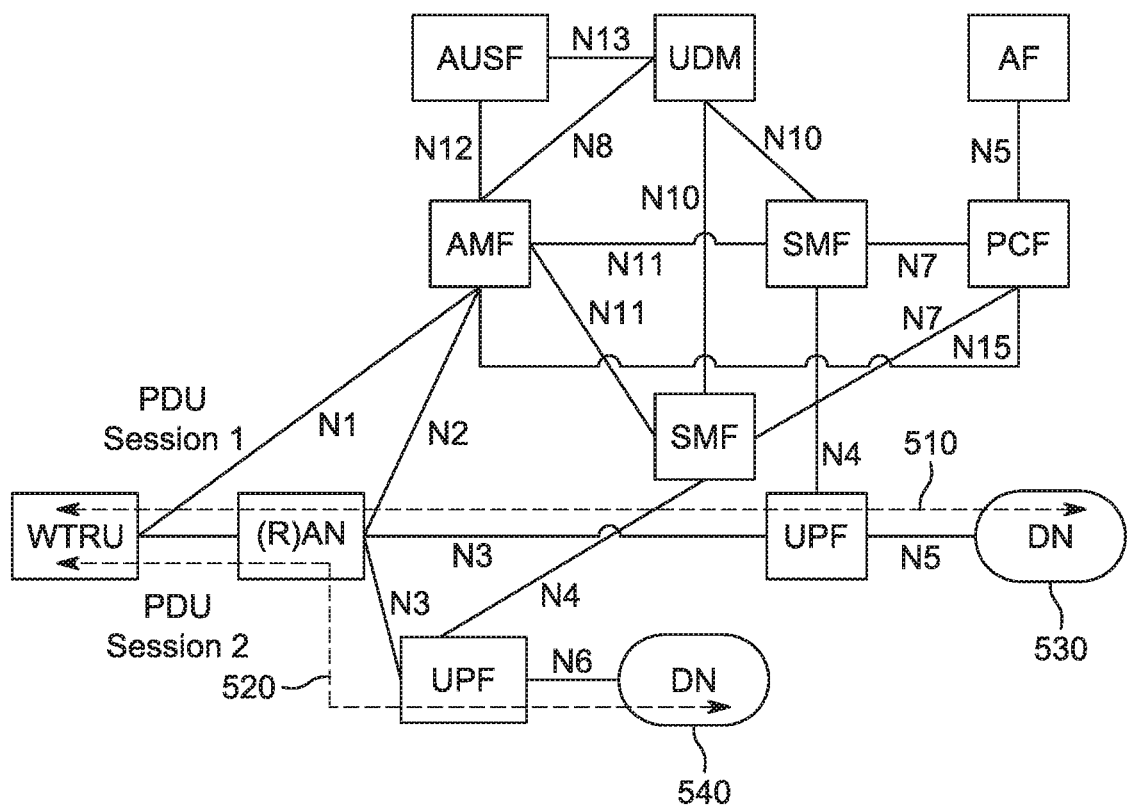
FIG. 5 is a system diagram illustrating an example non-roaming 5G system architecture for multiple PDU sessions.

FIG. 5 is a system diagram illustrating an example non-roaming 5G system architecture for multiple PDU sessions. For example, a dedicated PDU session may be used for Edge Computing (EC), and another PDU session may be used for non-EC traffic. In this example, traffic flow 510 pertaining to the first PDU session may proceed to a central DN 530. The traffic flow 520 pertaining to the second PDU session may proceed to the local DN 540, and may be terminated at the local DN 540 or may pass through to an external network.

Figure 6:
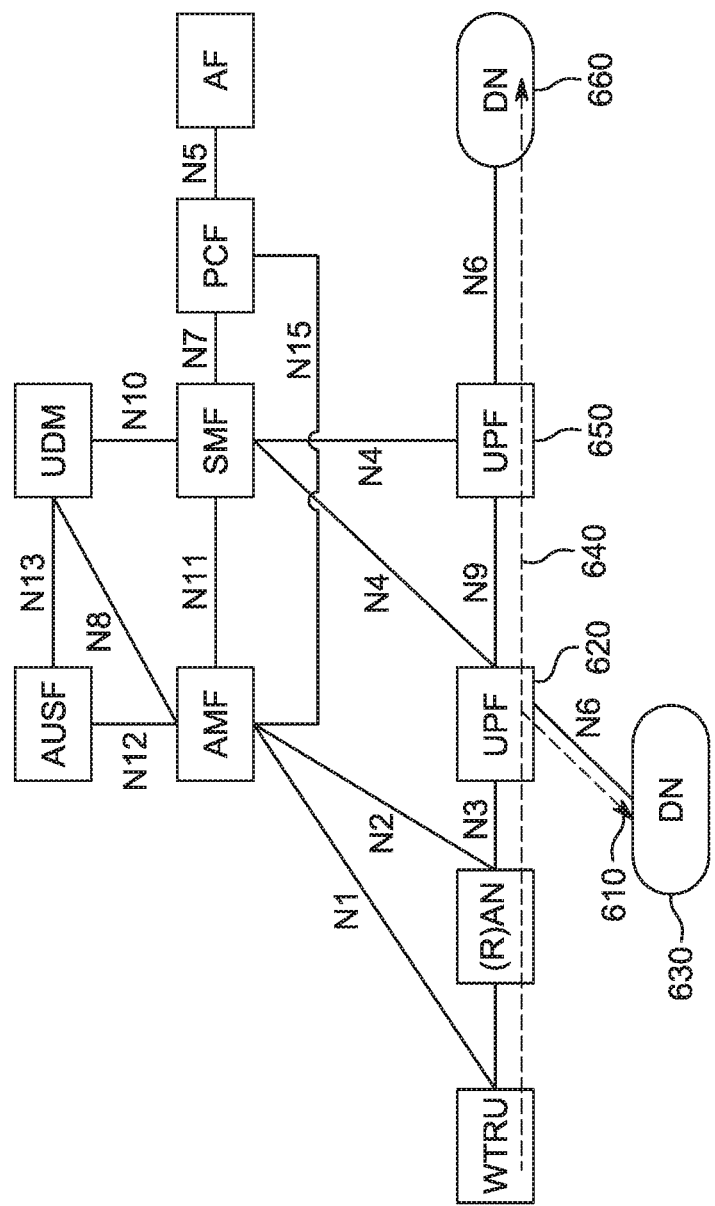
FIG. 6 is a system diagram illustrating an example of a single PDU session in a non-roaming 5G System architecture.

FIG. 6 is a system diagram illustrating an example of a single PDU session in a non-roaming 5G System architecture for concurrent access to two (e.g., local and central) data networks. In this example, EC traffic 610 may be steered toward a local DN 630 by a first UPF 620, and non-EC traffic 640 may be forwarded to a second UPF 650, which steers the non-EC flows towards an external DN 660. The local DN 630 may terminate certain flows or pass-through the flows.

Each PDU session may support a single PDU session type (e.g., support the exchange of a single type of PDU requested by the WTRU at the establishment of the PDU session). The following example PDU session types may be defined: IPv4, IPv6, Ethernet, and Unstructured (where the type of PDU exchanged between the WTRU and DN may be transparent to the 5G system). PDU sessions may be established (e.g., upon WTRU request), modified (e.g., upon WTRU and 5GC request) and/or released (e.g., upon WTRU and 5GC request) using NAS SM signaling exchanged over N1 between the WTRU and the SMF. Upon request from an Application Server, the 5GC may trigger the WTRU to establish a PDU session to a specific data network name (DNN).

The SMF may be responsible for checking whether the WTRU requests are compliant with a user subscription associated with the requesting WTRU. For this purpose the SMF may retrieve SMF level subscription data from the UDM. Such data may indicate, per DNN, the allowed PDU session type, and whether in case of Home Routing the visited public land mobile network (VPLMN) is allowed to insert an uplink classifier (UL CL) or a branching point for a PDU session towards this DNN. Information regarding the allowed service and session continuity (SSC) modes may be provided to the SMF in the VPLMN by the SMF in the home public land mobile network (HPLMN).

In a PDU session establishment request sent to the network, the WTRU may provide a PDU session identifier (ID). The WTRU may also provide a PDU session type, slicing information (e.g., single network slice selection assistance information (S-NSSAI)), the DNN, and/or SSC mode.

Table 1 illustrates example attributes of a PDU session:

TABLE 1

| PDU session attribute | May be modified later during the lifetime of the PDU session | Notes |
| --- | --- | --- |
| Slicing information | No | (Note 1)(Note 2) |
| DNN (Data Network Name) | No | (Note 1)(Note 2) |
| PDU session Type | No | (Note 1) |
| SSC mode | No | (Note 1) The semantics of Service and Session Continuity mode is further discussed herein |
| PDU session ID | No | |

NOTE 1:
If it is not provided by the WTRU, the network may determine the parameter based on default information received in a user subscription. Subscription to different DNN(s) may correspond to different default SSC modes and different default PDU session Types.
NOTE 2:
Slicing information and DNN are used by AMF to select an SMF to handle a new session.

A PDU session establishment procedure in the non-roaming and roaming with local breakout cases may be used to establish a new PDU session and/or to hand over an existing PDU Session between 3GPP access and non-3GPP access. In the roaming case, the AMF may determine whether a PDU session is to be established in local break-out (LBO) or home routing. In the case of LBO, the procedure is the same as in the non-roaming case, except that the SMF, the UPF and the PCF are located in the visited network.

Figure 7:
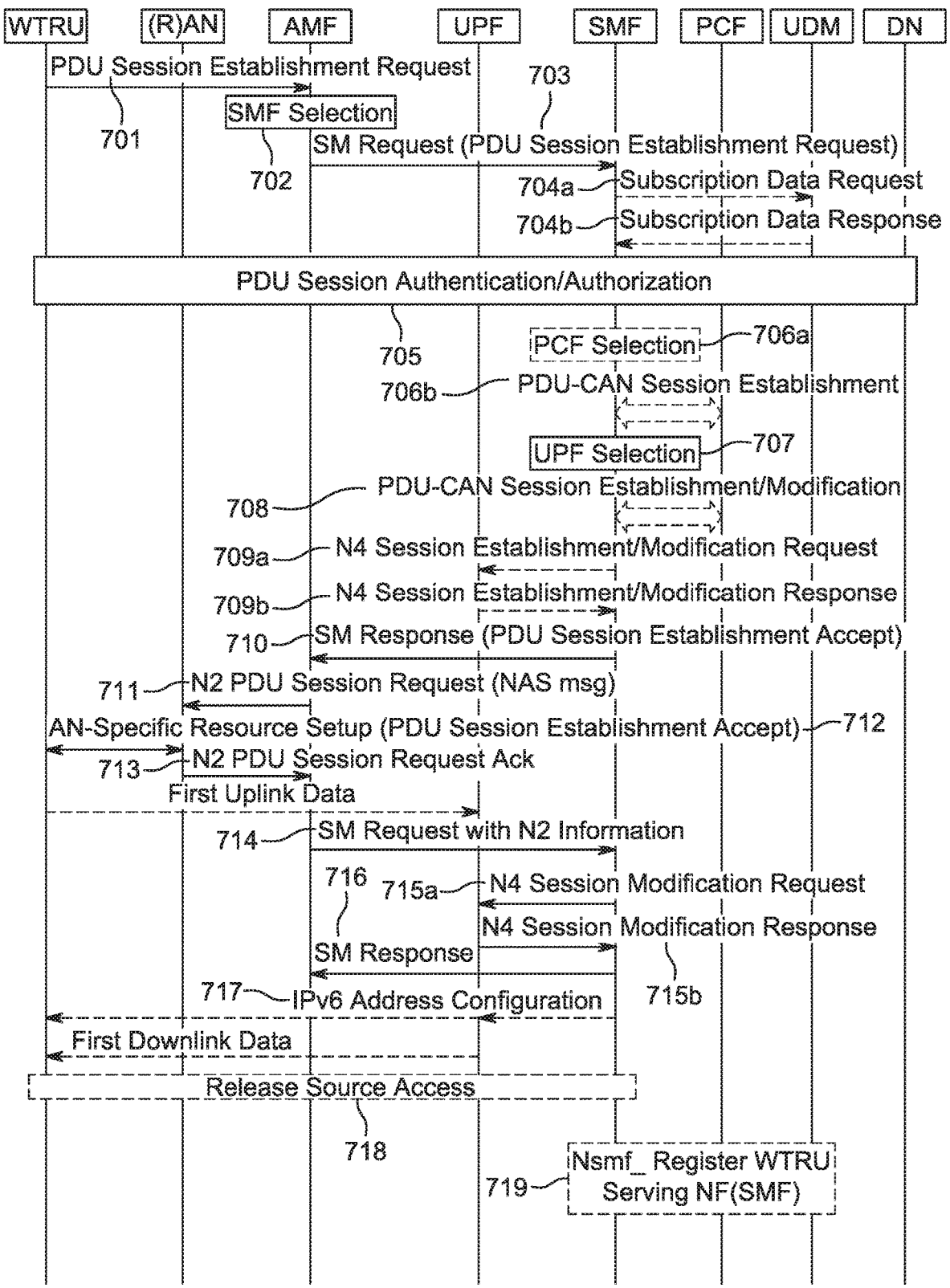
FIG. 7 is a message sequence chart illustrating an example session establishment procedure for the non-roaming and roaming with LBO cases.

FIG. 7 is a message sequence chart illustrating an example session establishment procedure for the non-roaming and roaming with LBO cases. The procedure of FIG. 7 may assume that the WTRU has already been registered on the AMF, and thus that the AMF has already retrieved the user subscription data from the UDM. The messages, requests, and responses described herein may be described in the following format: "Message Type (Parameter X, Parameter Y . . . . Parameter N)."

In step 701, an NAS Message (e.g., including S-NSSAI, DNN, PDU Session ID, Request Type, and/or N1 SM information) is sent from a WTRU to the AMF. In order to establish a new PDU session, the WTRU may generate a new PDU Session ID. The WTRU may initiate the WTRU Requested PDU Session establishment procedure by transmitting an NAS message containing a PDU Session Establishment Request within the N1 SM information. The PDU Session Establishment Request may include a PDU Type, SSC mode, and/or Protocol Configuration Options. The Request Type may indicate an initial request if the PDU Session Establishment Request seeks to establish a new PDU session and may indicate an existing PDU session if the request refers to an existing PDU session between 3GPP access and non-3GPP access. The NAS message sent by the WTRU may be encapsulated by the AN in an N2 message towards the AMF, which may include user location information and access technology type Information. The N1 SM information may include an SM PDU DN Request Container containing information for the PDU session authorization by the external DN.

In step 702, the AMF determines that the message corresponds to a request for a new PDU Session based on the Request Type indicating an initial request and that the PDU Session ID is not used for any existing PDU Session(s) of the WTRU. If the NAS message does not contain an S-NSSAI, the AMF may determine a default S-NSSAI for the requested PDU session according to the WTRU subscription. The AMF may select an SMF according to a suitable procedure. The AMF may store an association of the PDU session ID and the SMF ID. In the event the Request Type indicates an existing PDU Session, and either the AMF does not recognize the PDU Session ID or the subscription context from the UDM does not contain an SMF ID corresponding to the DNN, such cases may be handled as error cases.

In step 703, an SM Request (e.g., including a Subscriber Permanent ID, DNN, S-NSSAI, PDU Session ID, AMF ID, N1 SM information (e.g., PDU Session ID, PDU Session Establishment Request), user location information, and/or Access Technology Type) is sent from the AMF to the SMF. The AMF ID may uniquely identify the AMF serving the WTRU. The N1 SM information may include the PDU Session Establishment Request received from the WTRU.

In step 704a, a Subscription Data Request (Subscriber Permanent ID, DNN) is sent from the SMF to the UDM. If the Request Type in step 703 indicates an existing PDU Session, the SMF may determine that the request is due to handover between 3GPP access and non-3GPP access. The SMF may identify the existing PDU Session based on the PDU Session ID. If the SMF has not yet retrieved the SM-related subscription data for the WTRU related to the DNN, the SMF may request this subscription data.

In step 704b, a Subscription Data Response is sent from the UDM to the SMF. Subscription data may include the authorized PDU type(s), authorized SSC mode(s), and/or default QoS profile. The SMF may determine whether the WTRU request is compliant with the user subscription and with local policies. If the request is not compliant, and the SMF may reject the WTRU request via NAS SM signalling (e.g., including a relevant SM rejection cause) relayed by the AMF, in which the SMF indicates to the AMF that the PDU session ID is to be considered as released and the rest of the procedure is skipped.

In step 705, a procedures relating to PDU session authentication/authorization are carried out. The signalling may take place between the SMF and the DN via a UPF. If the SMF needs to authorize/authenticate the establishment of the PDU session, the SMF may select a UPF and trigger the PDU session establishment authentication/authorization. If the PDU session establishment authentication/authorization fails, the SMF may terminate the PDU session establishment procedure and indicate a rejection to the WTRU.

In step 706a, if dynamic PCC is deployed, the SMF may perform PCF selection. In step 706b, the SMF may initiate PDU-CAN Session Establishment towards the PCF to obtain the default PCC Rules for the PDU Session. If the Request Type in step 703 indicates an existing PDU session, the PCF may initiate a PDU-CAN Session Modification instead.

An object of these procedures may be to receive PCC rules before selecting a UPF. If the PCC rules are not needed as input for UPF selection, the relevant procedures may be skipped.

In step 707, if the Request Type in step 703 indicates an initial request, the SMF may select an SSC mode for the PDU Session. If the procedures relevant to receiving PCC rules before selecting UPF were not performed, the SMF may also select a UPF. In case of PDU Type IPv4 or IPv6, the SMF may allocate an IP address/prefix for the PDU Session. For an Unstructured PDU Type, the SMF may allocate an IPv6 prefix for the PDU session and N6 point-to-point tunnelling (based on UDP/IPv6).

In step 708, if dynamic PCC is deployed and the PDU-CAN Session Establishment has not yet been performed, the SMF may initiate PDU-CAN Session Establishment towards the PCF to obtain the default PCC Rules for the PDU Session. Otherwise, if the Request Type indicates an initial request, and dynamic PCC is deployed, and PDU Type is IPv4 or IPv6, the SMF may initiate PDU-CAN Session Modification and provide the allocated WTRU IP address/prefix to the PCF.

In step 709, if the Request Type indicates an initial request and the procedures relevant to receiving PCC rules before selecting the UPF were not performed, the SMF may initiate an N4 Session Establishment procedure with the selected UPF. If, for instance, the Request Type does not indicate an initial request, or the procedures for receiving PCC rules were not performed, the SMF may initiate an N4 Session Modification procedure with the selected UPF. For example, in step 709a, the SMF sends an N4 Session Establishment/Modification Request to the UPF and provides packet detection, enforcement and reporting rules to be installed on the UPF for this PDU Session. If the CN Tunnel Info is allocated by the SMF, the CN Tunnel Info may be provided to the UPF in this step. In step 709b, the UPF acknowledges by sending an N4 Session Establishment/Modification Response. If CN Tunnel Info is allocated by the UPF, the CN Tunnel Info may be provided to the SMF in this step.

In step 710, an SM response (e.g., including Cause, N2 SM information (PDU Session ID, QoS Profile(s), and/or CN Tunnel Info), N1 SM information (e.g., including PDU Session Establishment Accept (e.g., Authorized QoS Rule, SSC mode, S-NSSAI, and/or allocated IPv4 address))) is sent from the SMF to the AMF.

The N2 SM information may carry information that the AMF may forward to the access network (AN) (e.g., RAN). For instance, the AMF may forward the CN Tunnel Info corresponding to the Core Network address of the N3 tunnel corresponding to the PDU session. The QoS Profile may provide the (R)AN with a mapping between QoS parameters and QoS Flow Identifiers (multiple QoS profiles can be provided to the (R)AN) and/or a PDU Session ID which may be used by AN signalling with the WTRU to indicate to the WTRU the association between AN resources and a PDU session for the WTRU.

The N1 SM information may contain the PDU Session Establishment Accept that the AMF may provide to the WTRU. Multiple Authorized QoS Rules may be included in the PDU Session Establishment Accept within the N1 SM information and in the N2 SM information. The SM Response may further contain PDU Session ID and information allowing the AMF to know which WTRU is the target as well to determine which access towards the WTRU to use. The access information may be used in the cases where a WTRU is simultaneously connected over 3GPP and non-3GPP access. In step 711, an N2 PDU Session Request (N2 SM information, NAS message (PDU Session ID, PDU Session Establishment Accept)) NAS message is sent from the AMF to the (R)AN. The AMF may send the NAS message containing, for example, a PDU Session ID and the PDU Session Establishment Accept targeted to the WTRU and the N2 SM information received from the SMF within the N2 PDU Session Request to the (R)AN.

In step 712, a PDU Session Establishment Accept message is sent from the (R)AN to the WTRU. The (R)AN may issue an AN specific signalling exchange with the WTRU that is related to the information received from the SMF. For example, in a case of a 3GPP RAN, an RRC Connection Reconfiguration may take place with the WTRU establishing the necessary RAN resources related to the Authorized QoS Rules for the PDU Session request received in step 710.

The (R)AN may also allocate (R)AN N3 tunnel information for the PDU Session. The (R)AN may forward the NAS message (PDU Session ID, N1 SM information (PDU Session Establishment Accept)) provided in step 710 to the WTRU. The (R)AN may only provide the NAS message to the WTRU if the necessary RAN resources are established and the allocation of (R)AN tunnel information is successful.

In step 713, the (R)AN sends to the AMF an N2 PDU Session Response (PDU Session ID, Cause, N2 SM information (PDU Session ID, (R)AN Tunnel Info, List of accepted/rejected QoS profile(s))). The (R)AN Tunnel Info may correspond to the Access Network address of the N3 tunnel corresponding to the PDU session.

In step 714, the AMF sends to the SMF an SM Request (N2 SM information). The AMF may forward, for example, the N2 SM information received from the (R)AN to the SMF. It is noted that in some implementations, steps may be included such that the WTRU indicates to the core network that the WTRU has successfully established the PDU Session, or whether it is sufficient with a successful establishment in (R)AN indicated in step 712. For example, the WTRU may send an NAS PDU Session Establishment Complete message to indicate that the WTRU has successfully established the PDU Session.

In step 715a, if the N4 session for this PDU Session was not established already, the SMF initiates an N4 Session Establishment procedure with the UPF. Otherwise, the SMF initiates an N4 Session Modification procedure with the UPF. The SMF provides AN Tunnel Info and CN Tunnel Info. The CN Tunnel Info only needs to be provided if the SMF selected CN Tunnel Info in step 708. If the PDU Session Establishment Request was due to mobility between 3GPP and non-3GPP access, the downlink data path may be switched towards the target access in this step. In step 715, the UPF provides an N4 Session Establishment/Modification Response to the SMF.

In step 716, the SMF sends an SM response (Cause) to the AMF. After this step, the AMF may forward relevant events to the SMF, e.g. at handover, where the (R)AN Tunnel Info changes or the AMF is relocated. Relevant events may include, for instance, changes in user location or Access Type received by the AMF from the R(AN) in association with N1 signalling. In some implementations, the SMF may explicitly subscribe to these events, or the subscription may be implicit.

In step 717, in the PDU Type IPv6 case, the SMF generates an IPv6 Router Advertisement and sends it to the WTRU via an N4 interface and the UPF.

In step 718, if the PDU Session Establishment request is due to a handover between 3GPP access and non-3GPP access, (e.g., the request type indicates an existing PDU Session) the SMF executes procedures in order to release the user-plane over the source access (3GPP or non-3GPP access).

In step 719, if the SMF identity is not included in step 704b by the UDM in the DNN subscription context, the SMF invokes the "UDM_Register WTRU serving NF" service including the SMF address and the DNN. The UDM may store, for example, the SMF identity, address and the associated DNN. If, during the procedure the PDU session establishment is not successful, the SMF may inform the AMF.

An Application Function (AF) may send requests to influence SMF routing decisions for traffic of a PDU session. This may influence UPF selection and allow routing of user traffic to a local DN. Such requests may contain, for example, nformation to identify the traffic to be routed, information as to where to route the traffic, potential locations of the AFs to where the traffic routing should apply, and time indications as to when the traffic routing is to apply. Information identifying the traffic may include a DNN and/or an application identifier or traffic filtering information. In some implementations, a mapping may be provided between the information provided by the AF and the information used in the Core Network. Information as to where to route the traffic may include an External Identifier, mobile station international subscriber directory number (MSISDN), or another identifier pertaining to an individual WTRU, a group of WTRUs, or—all WTRUs. The potential locations of the AFs may, e.g., be used for UPF selection.

The AF issuing such requests may be assumed to belong to the public land mobile network (PLMN) serving the WTRU. The AF may issue requests on behalf of other Application Functions not owned by the PLMN serving the WTRU. The SMF may, based on local policies, take this information into account to select or reselect UPF(s) for PDU sessions; activate mechanisms for traffic multi-homing or enforcement of an UL Classifier (UL CL); and/or inform the Application Function of the (re)selection of the UP path. Mechanisms for traffic multi-homing or enforcement of a UL CL may include providing the UPF with traffic forwarding (e.g., break-out) rules.

In some implementations, the application function request may be routed to the SMF, e.g., from the NEF or the PCF.

An Application Function may request to be notified of the location information of the WTRU(s).

A first driver for the edge computing trend is that Network Operators may desire to provide additional value added services and bring better performance and Quality of Experience to end users by leveraging unique characteristics of their Access Network, such as, for example, proximity to the end user and awareness of users' identity. A second major driver for edge computing is the need to complement underpowered IoT devices with computing capability at the edge at the network to enable complex operations or operations involving large amounts of data and devices, which simply is not possible otherwise due to latency and capacity limitations introduced by backhaul links.

A third driver for edge computing comes from the development of cloud computing itself, which leads to more and more integration of software development and deployment activities as illustrated by the "DevOps" model of development, in order to cope with increasing system complexity. This trend is enabled by technologies like Network Function Virtualization (NFV) can also be described as "merging network infrastructure with the IT world", and at its core, aims to reduce capital and operating expenditures for the application provider. MEC can be seen as a way to extend this new flexibility beyond the data centers into the rest of the Internet and even end user devices, which ultimately facilitate innovation for new classes of applications not well served by Distant Clouds.

Figure 8:
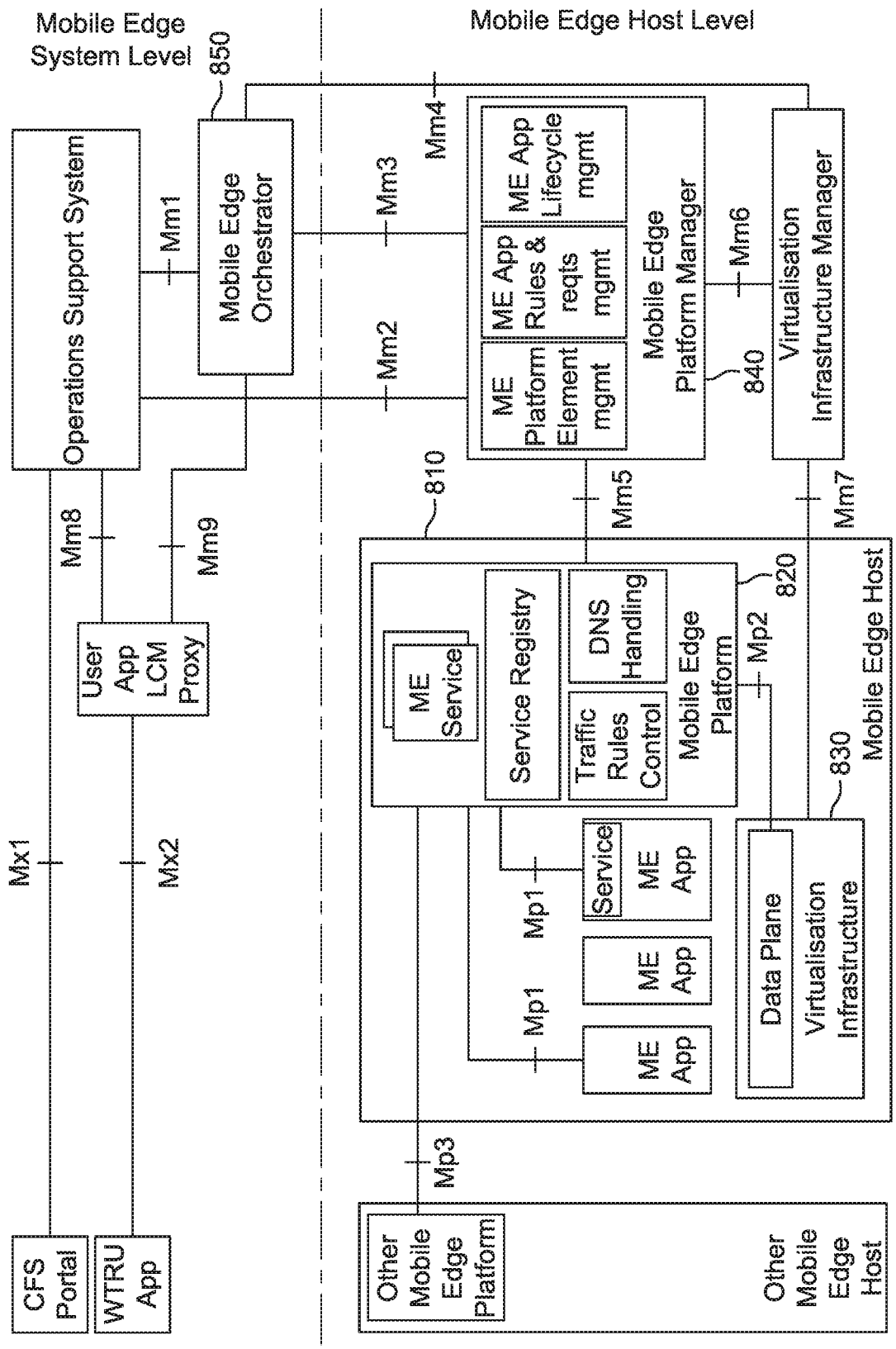
FIG. 8 is a system diagram illustrating an ETSI MEC Architecture.

FIG. 8 is a system diagram illustrating an ETSI MEC Architecture. In the example shown in FIG. 8, the mobile edge host (MEH) 810 is an entity that contains a mobile edge platform (MEP) 820 and a virtualization infrastructure 830. The virtualization infrastructure may include a data plane that executes the traffic rules received by the MEP 820, and routes the traffic among, for example, applications, services, DNS server/proxy, 3GPP networks, local networks, and external networks. The MEP 820 is a collection of essential functionality_to run mobile edge applications on a particular virtualization infrastructure The MEP may receive traffic rules, for example, from the mobile edge platform manager (MEPM) 840, applications, or services, and instruct the virtualization infrastructure 830 accordingly.

Mobile edge applications (ME Apps) may be instantiated on the virtualization infrastructure 830 of the MEH 810 based on configuration or requests validated by the Mobile Edge Platform Manager (MEPM) 840. The MEPM 840 may manage application life cycles and inform the mobile edge orchestrator (MEO) 850 of relevant application related events, provide element management functions to the mobile edge platform, and manage application rules and requirements.

Figure 9:
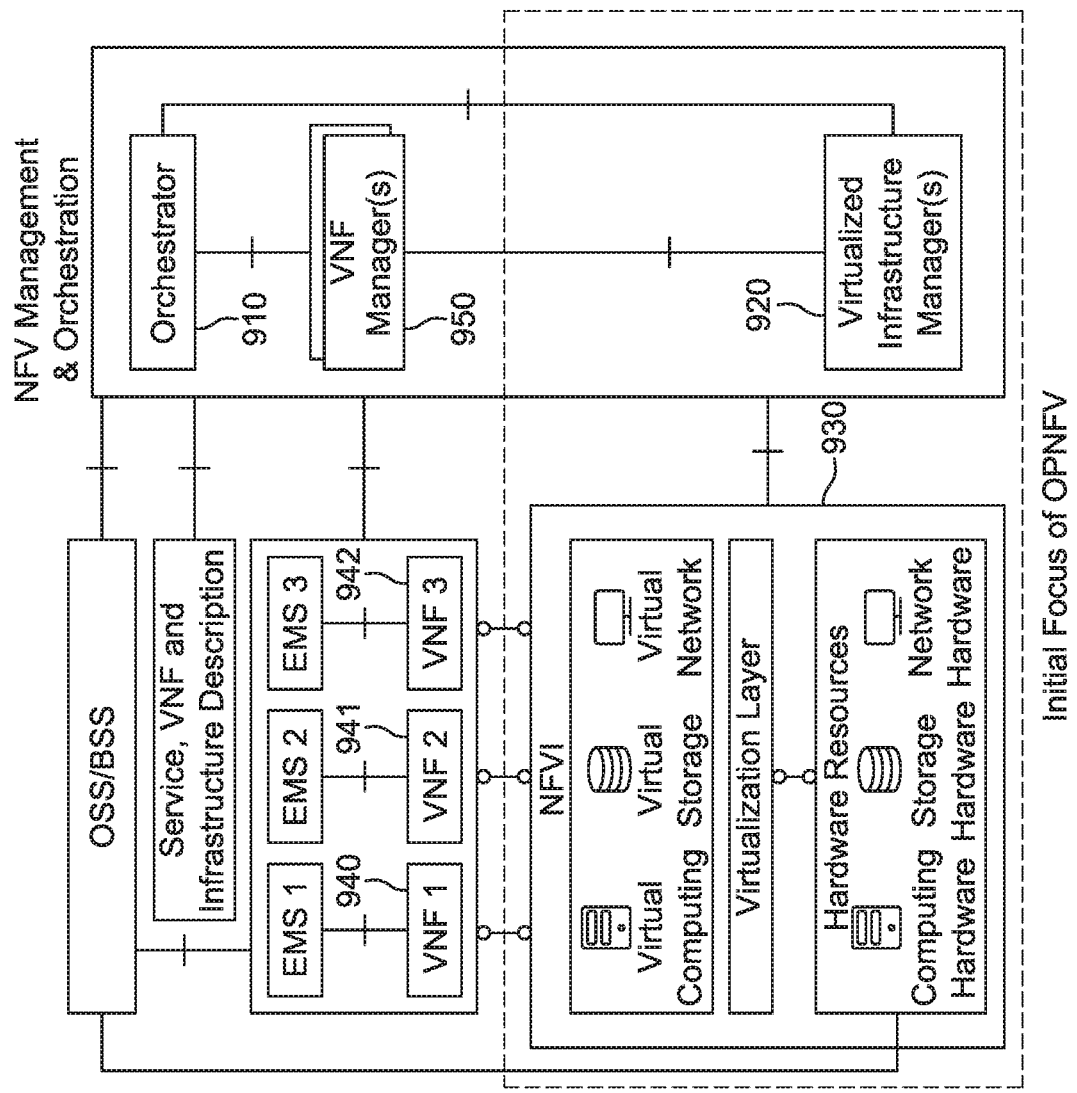
FIG. 9 is a system diagram illustrating example NFV management and organization (MANO)

FIG. 9 is a system diagram illustrating example NFV management and organization (MANO). In NFV MANO, functions that are typically required by NFV orchestration include service coordination and instantiation, service chaining, scaling services, and/or service monitoring. For service coordination and instantiation, the orchestration software must communicate with the underlying NFV platform to instantiate a service, i.e., it may create the virtual instance of a service on the platform. Service chaining may enable a service to be cloned and multiplied to scale for either a single customer or many customers. Scaling services may handle, when more services are added, finding and managing sufficient resources to deliver the service. Service monitoring may track the performance of the platform and resources to make sure they are adequate to provide for good service.

With reference to FIG. 9, resource orchestration may be implemented to ensure that adequate compute, storage, and network resources are available to provide a network service. To meet that objective, the network function virtualization orchestrator (NFVO) 910 may work either with the virtual infrastructure manager (VIM) 920 or directly with NFV infrastructure (NFVI) resources 930 depending on the requirements. It may coordinate, authorize, release, and engage NFVI resources 930 independently of any specific VIM. It may provide governance of virtual network function (VNF) instances 940, 941, and 942 that share NFVI resources.

In order to solve the new challenges faced by network operators, it may be desired to deploy NFV-based solutions across different points of presence (POPs) or within one POP but across multiple resources. Without NFV, this may not be possible. Using NFV MANO, service providers may build in this capability using an NFVO, which may provide the ability to engage the VIMs 910 directly through their northbound APIs instead of engaging with the NFVI resources directly. This may eliminate the physical boundaries that may normally hinder such deployments. To provide service orchestration, the NFV orchestrator may create end-to-end service among different VNFs 940, 941, and/or 942, which may be managed by different VNFMs 950 with which the NFVO 910 coordinates.

Hardware virtualization or platform virtualization may refer to the creation of a virtual machine that acts like a real computer with an operating system. Software executed on such virtual machines may be separated from the underlying hardware resources.

Software virtualization may include operating system-level virtualization (hosting of multiple virtualized environments within a single OS instance); application virtualization and workspace virtualization (hosting of individual applications in an environment separated from the underlying OS); service virtualization (emulating the behavior of dependent (e.g., third-party, evolving, or not implemented) system components that are needed to exercise an application under test (AUT) for development or testing purposes).

Memory virtualization may include aggregating random-access memory (RAM) resources from networked systems into a single memory pool. Virtual memory may give an application program the impression that it has contiguous working memory, isolating it from the underlying physical memory implementation. Storage virtualization may include the process of abstracting (e.g., completely) logical storage from physical storage. Network virtualization may include creation of a virtualized network addressing space within or across network subnets. Virtual private network (VPN) is a network protocol that replaces the actual wire or other physical media in a network with an abstract layer, allowing a network to be created over the Internet.

Various hooks may be used to integrate MEC in a 5G network. If an MNO is an MEC service provider, then MEC (Control Application Function) may be implemented internally and may interact directly with an SMF or other 5G function, or may interact via NEF. For an external (as well as internal) MEC service provider, hooks may include obtaining the control to steer traffic flow, per user, per application, to set policies for QOE and/or session continuity, to obtain network information, radio and core network, and/or the capability to set network parameters, which may be difficult for third party provider. It may be desired to enable these capabilities for a third party cloud provider through some standardized, well-known APIs.

Various procedures and APIs may allow third party cloud providers to provide edge computing service to network service providers in the context of a 5G network. Such APIs and procedures may include APIs and procedures for initial configuration and setup; APIs and procedures for exchange of network information; and/or APIs and procedures for dynamically changing cloud resource location and steering user plane traffic towards the new location.

For a third-party edge Computing Service Provider (CSP), the following assumptions related to the 3GPP 5G network are made for various examples herein.

The CSP may own, deploy and manage computing resources. Tower companies and/or real estate owners may deploy cloud resources in their facility. These deployments may be viewed as small data centers, which can be used by network service providers. Third-party cloud service providers may operate in Infrastructure as a Service (IaaS) or Platform as a Service (PaaS) modes. When the CSP provides IaaS kinds of service to the MNO, the MNO may request computing resources close to a desired location. The CSP may reserve that resource at a location and provide an interface to the MNO for managing the lifecycle of edge applications. The MNO may also be responsible for resource monitoring and may request more resources or release resources based on load. The CSP also manages application life cycles in a PaaS model. Application developers may provide edge applications to the CSP (instead of the MNO) to be managed by CSP. The MNO may direct the traffic towards the edge application based on the CSP's request or configuration. Various examples described herein relate to the second scenario, where the CSP provides application service.

A 3GPP local DN may represent the edge computing facility owned and deployed by third party service provider. The "orchestration function" may be owned by the CSP and provide services, such as resource provisioning or onboarding of applications. The CSP orchestration function may receive requests from "Edge Applications" or the "Edge platform" as users try to connect. The requests may include location information about users trying to connect to the application. The CSP orchestration function may then allocate resources and onboard applications based on the location information. After onboarding of applications, user plane traffic may be steered towards the edge application.

The CSP orchestration function may communicate with a 3GPP management system and any other MANO to co-ordinate activities, for example, to negotiate policy decisions. In cases/scenarios where the CSP is only an IaaS provider, a 3GPP management system may request resources through the CSP orchestrator. The CSP and 3GPP network may exchange user information and/or a user ID to identify the user plane corresponding to a user. It may be assumed that the user ID or user information exchanged is not a 3GPP defined ID. Rather, the ID may be an IP address or a token provided by external trusted authority, or another identifier.

The CSP may reserve resources and onboard applications based on knowledge of the location of the WTRUs and DNN. The 3GPP MNO may provide the network topology information to the CSP. The topology information may include information such as NodeID, LocationID, and/or CellIDs. The CSP may then deploy cloud resources using the topology information. In cases where the CSP wants to refer to a cloud deployment, it may use NodeID or LocationID from the topology information. Based on user location, such as CellID, or NodeID, the CSP may determine a desired (e.g., optimized or ideal) cloud resource location where user plane traffic can be steered. No one-to-one mapping between a cellular node and cloud resource location is assumed.

As used herein, MEC is assumed to be an AF for a 3GPP 5G network. It may be possible to use NEF functions to configure, set policy information, and perform traffic steering towards MEC platforms deployed within the network as well as in a local DN. AFs may be trusted or untrusted from a 3GPP perspective. A trusted AF may include the MEC platform owned by the MNO. Trusted AFs may directly communicate with 3GPP network functions (e.g., SMF). Untrusted AFs may be restricted to communicating or receiving 3GPP services via an NEF. Third-party (e.g., non-MNO) MEC providers may be categorized as untrusted AFs. In order to enable third party MEC providers, an NEF, specific to MEC platform needs, may be specified. The NEF may be implemented within the MNO-owned core network, and may be provided by specialized hardware such as a server or switch, and storage devices. The NEF may also be implemented as a virtualized function. In cases where the NEF is implemented on the MNO's premises, the NEF may be co-located with a gNB. In other examples, NEF may be located within a customer premises equipment (CPE), such as a router, network switch, gateway, set-top box, DVR, or terminal and associated equipment at the customer's physical location rather than on the providers premises or in between.

For example, an MEC NEF function, a set of APIs, and methods to enable third party MEC platforms to provide MEC services via the 3GPP 5G Network may include "MEC NEF (MNF)" and "MEP 5G Adapter (M5A)" functions. An MNF may be an extension to a 3GPP NEF, and M5A functions may provide additional services in a Mobile Edge Platform (MEP). For example, the M5A function may authenticate with an MNF using an authentication API, e.g. "GET AUTHENTICATION TOKEN", and the M5A function may use an API, e.g. "SET TRAFFIC RULES" towards the MNF to setup a traffic path. The MNF may send traffic rule-related information to the SMF and send a policy update to the PCF. Example traffic rules may include "Steer Flow ID=N, at UPF=i to Local DN=y". The M5A function may interact with the MNF to get and set, for instance, radio network and core network information. The M5A function may send "GET XXX NETWORK INFORMATION" to the MNF, and may send "SET XXX NETWORK INFORMATION" to MNF. Example requests for network information may include "GET AVAILABLE BW, Total Traffic VOLUME, BIDIRECTIONAL BW, LOAD AT LOCATION=x." The M5A function may set policy related information by using APIs to interact with the MNF: for example, the M5A function may send "SET MOBILITY AND SESSION CONTINUITY POLICY" to the MNF, and the MNF may send received policy information to PCF.

FIG. 10 is a system diagram showing example logical architecture for MEC and 5G system integration. In the example of FIG. 10, the CSP is assumed to be an untrusted third party Application Function. Note, this is consistent with 5G naming conventions in which any function outside of MNO's network is deemed untrusted. The term CSP is used in a more generic sense here to include a control function residing in an external edge computing platform. For example, it may be similar to some industry standard realizations such as a mobile edge platform manager (MEPM) in ETSI MEC. In the example of FIG. 10, MEC resources 1010 are deployed as part of the local DN 1020. It is assumed that resource deployment and management is controlled by the CSP. Edge application deployment and application life cycle management may also managed by the CSP or third party application service provider.

Because the CSP is an untrusted third party AF in this example, it can only interact with the NEF 1030. Example functionality that can be enabled by the MEPM and NEF interaction may include: initial provisioning of the system to setup default PDU sessions; obtaining location and radio network information, and using this information to dynamically manage edge applications and/or edge computing resources; controlling CN and AN configuration; and/or obtaining additional network information such as user context, or CN operational information, etc.

Figure 11:
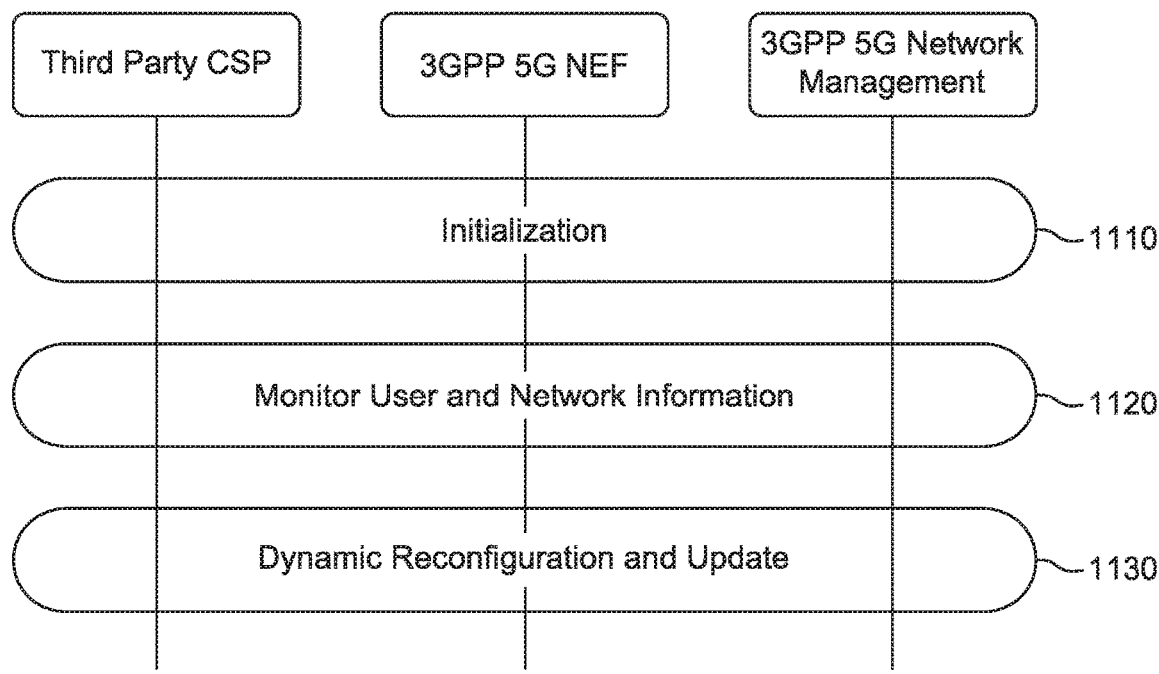
FIG. 11 is a message sequence chart illustrating example procedures for enabling third-party CSP.

FIG. 11 is a message sequence chart illustrating example procedures for enabling third-party CSPs to provide MEC service. At step 1110, a third-party CSP may initialize a management system by providing, for example, identities of valid subscribers and an identity of a data network. At step 1120, the CSP may monitor user location, application usage, and network information. At step 1130, the CSP may decide, based on the monitored information, to steer user traffic to a local DN, and initiate procedures to dynamically set or modify network parameters accordingly. The steps illustrated in FIG. 11 are discussed further herein.

Various examples herein assume that the CSP deploys cloud resources at different points of presence (POPs) of the network. At a certain POP, the CSP may have a DNN name which is known to MNOs. For example, a DNN name might be of the form: mycsp.com. Third party MEC service providers may manage resources and traffic under some scenarios. For example, in pre-provisioned or pre-configured scenarios, the CSP may allocate resources and onboard an application to its edge computing resources. Accordingly, the CSP may already know that user traffic in certain cells or locations should be steered toward the edge computing facility. The network may determine whether each user can use the service. In a live operation or runtime scenario, the CSP may reserve resources and onboard an application at an edge computing facility. In such scenarios, the CSP may need to live-update the SMF and PCF settings.

Figure 12:
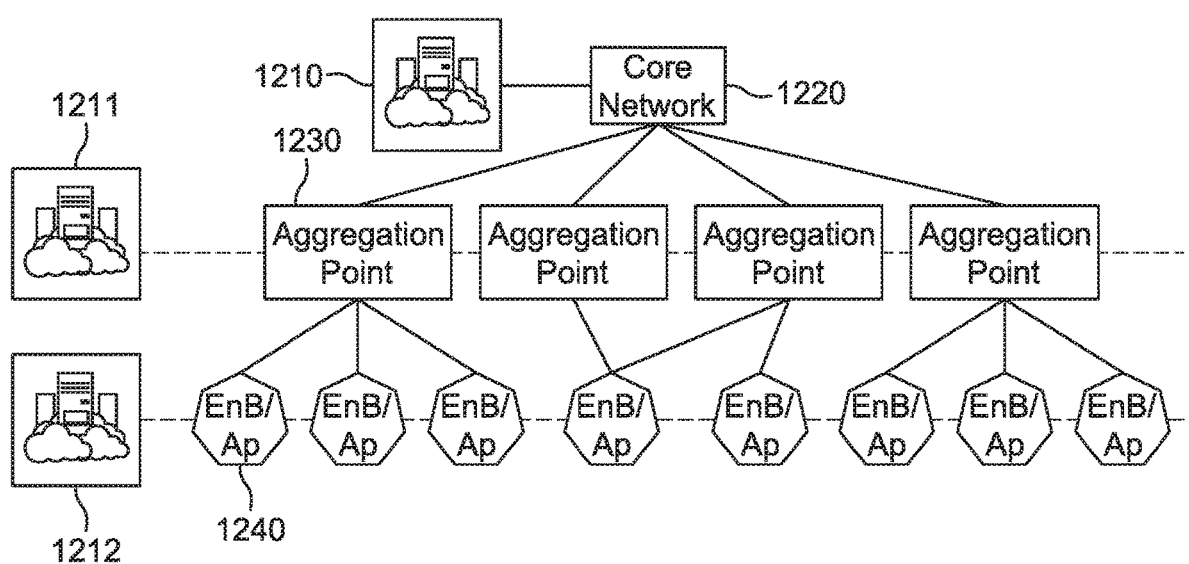
FIG. 12 is a tree diagram illustrating example cloud resources deployed at different points in a network.

FIG. 12 is a tree diagram illustrating example cloud resources deployed at different points in a network. As shown in FIG. 12, cloud resources 1210, 1211, or 1212 may be deployed, for example, at the core network 1220, at an aggregation point 1230 above the EnB or AP, or at the very edge 1240 of the network, such as at an EnB, AP, small cell, enterprise server or other CPE. It may be assumed that, based on the use case, application requirement, number of users, network conditions, etc., edge applications may run at different levels of the network deployment, such as EnB level, first/second aggregation point, core network etc. It is also possible that edge applications may start at a certain level, and later be moved to a different level (e.g., dynamically). The CSP may obtain the network topology from the MNO, and may maintain a map of resources deployed close to a network node tracking information such as NodeID, LocationID, and/or compute resources (compute, storage). The CSP may update the MNO's database (e.g. UDM) with information regarding which users have subscribed to a DNN, and users may be provided with the DNN name.

Figure 13:
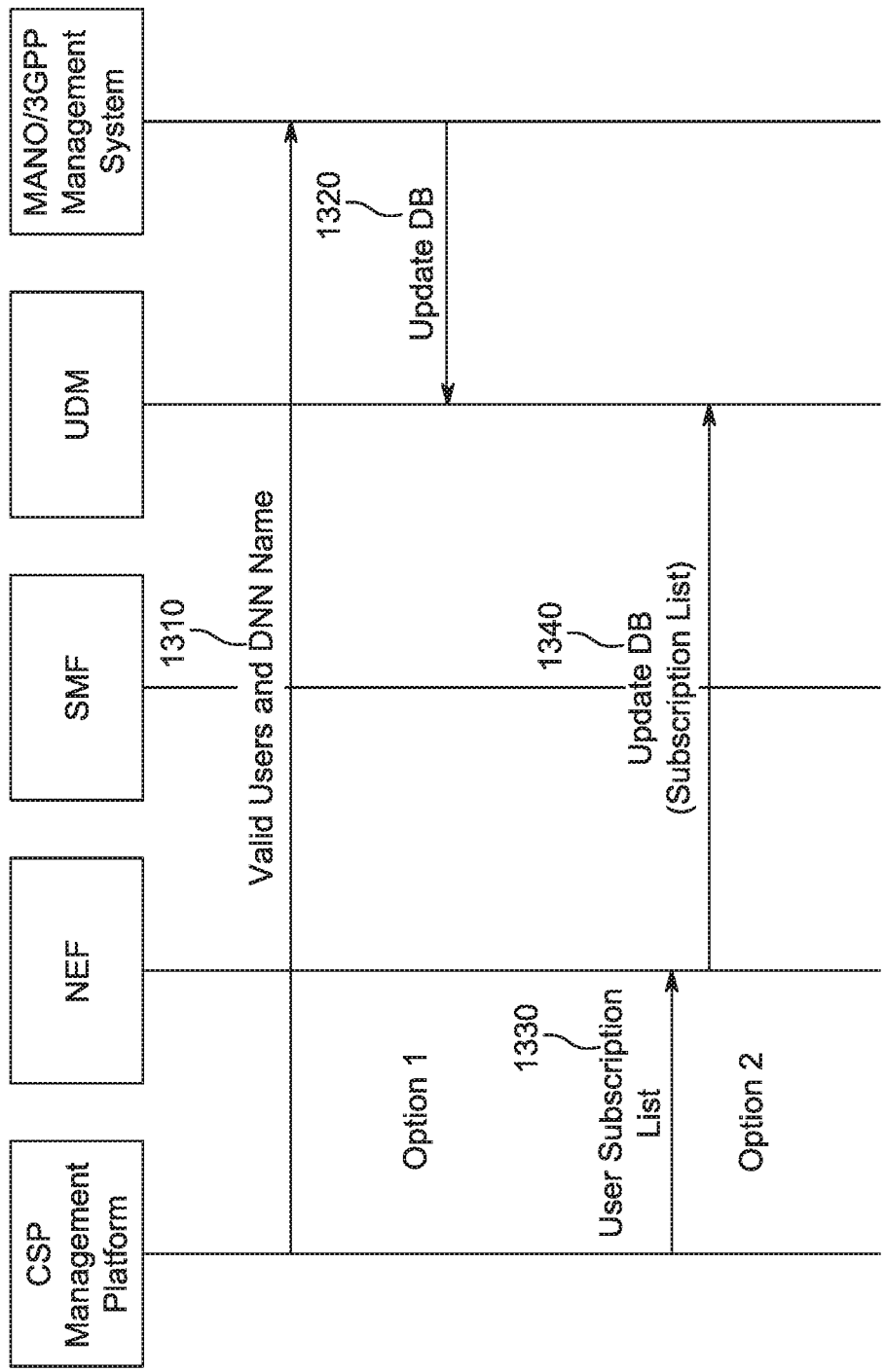
FIG. 13 is a message sequence chart illustrating an example initialization procedure, where a CSP updates an MNO's database with a valid subscriber list.

FIG. 13 is a message sequence chart illustrating an example initialization procedure in which a CSP updates an MNO's database with a valid subscriber list. In a first example, a CSP may provide the names of users who are subscribed to use the service provided by a particular DNN (e.g., mycsp.com), to the MNO. As shown in FIG. 13, the CSP provides a subscription list to the 3GPP management system in step 1310. The list may include information such as DNN name and UserID. The CSP may operate more than one DNN; hence, the DNN name may be provided as part of the list. The DNN name may correspond to and/or be similar to a domain name. The CSP may use different DNN names and/or domain names to share cloud resources among different network service providers. The CSP may assign different priorities and/or privileges to DNN names. At step 1320, the 3GPP management system may update the database (e.g., the UDM), with the information obtained from CSP. In a second example, the CSP may first provide the subscriber list to the NEF as shown at step 1330. At step 1340, the NEF may update the UDM with the provided information. In some embodiments, the NEF may first discover the correct UDM, authenticate, and then update the database. After the database has been updated, the user may be provided with the DNN name it has subscribed to. A WTRU may send the DNN name as part of PDU establishment. If the WTRU does not send the DNN name then the 3GPP network may obtain subscription information from the UDM and set up a PDU session with the local DNN.

Figure 14:
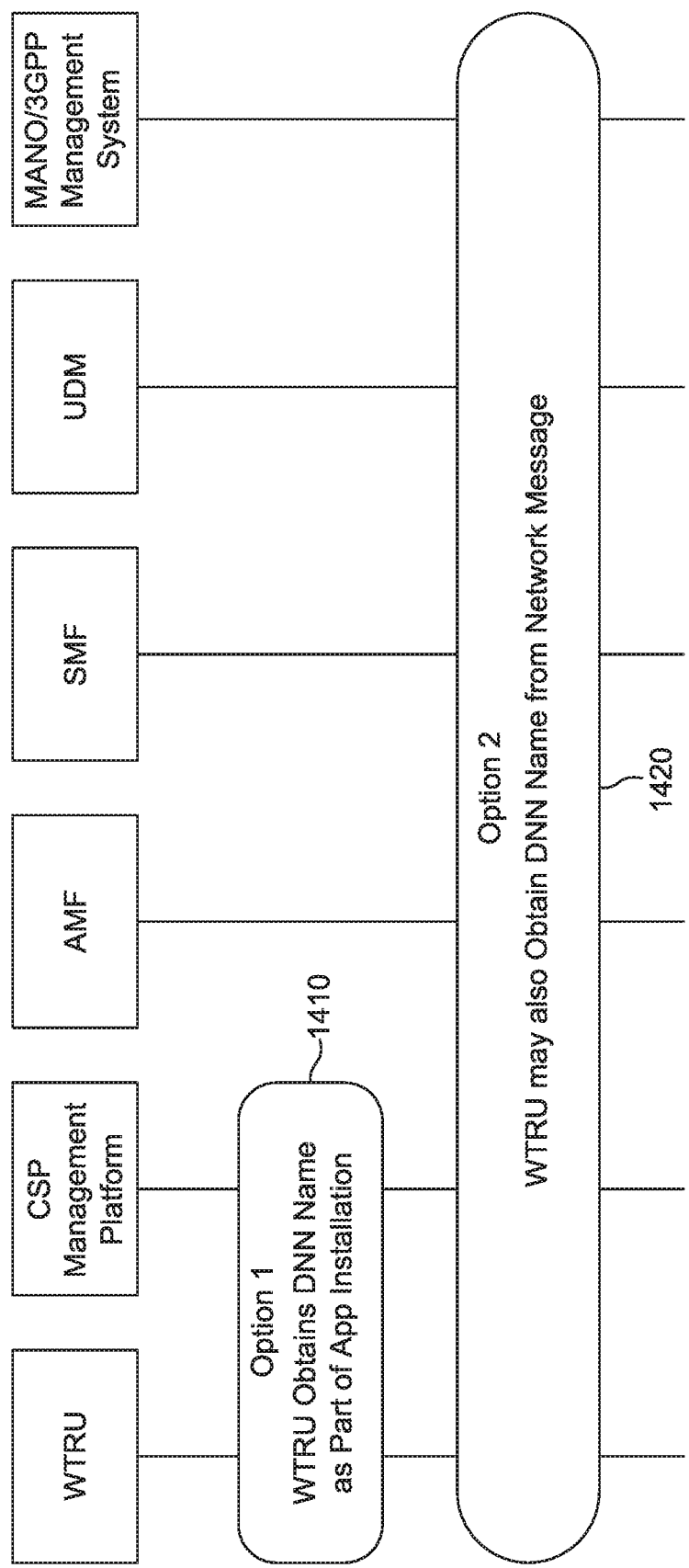
FIG. 14 is a message sequence chart illustrating another example procedure.

FIG. 14 is a message sequence chart illustrating another example procedure. In some scenarios, the user knows the DNN name when it is configured, such as when a WTRU installs an application that runs on the edge. As shown in FIG. 14, the WTRU may obtain the DNN name from the CSP management platform at step 1410. In another embodiment, as shown in step 1420, the 3GPP network may supply the valid DNN name as part of initial registration procedure. The CSP may create a "deployment map" of cloud resources. This map may contain (1 . . . . N) records of deployment details, such as compute capacity, storage capacity, and/or a list of Cell IDs (1 . . . n). The map may also track resources at registration area level including compute capacity, storage capacity, and/or registration area information.

Figure 15:
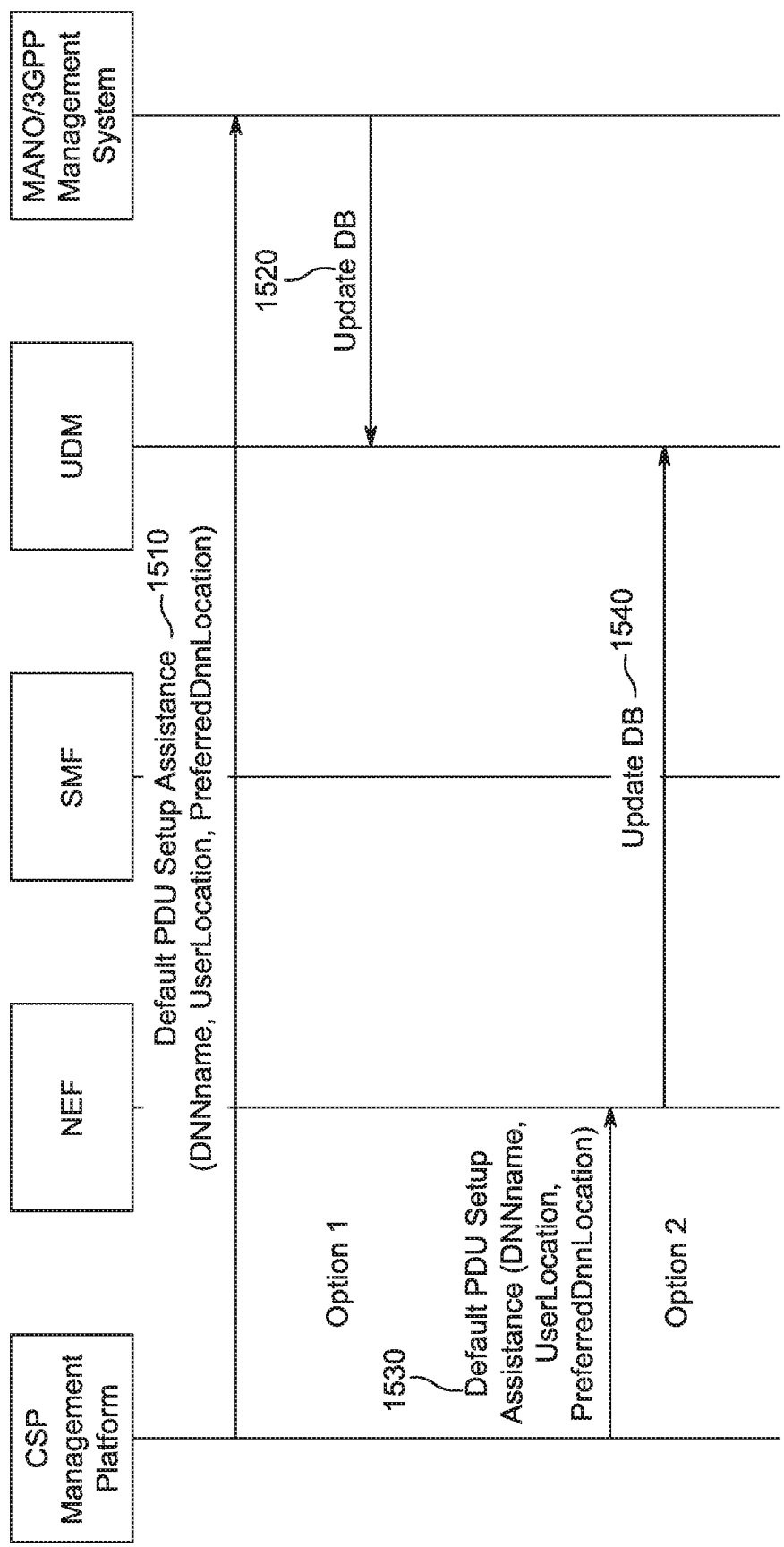
FIG. 15 is a message sequence chart illustrating another example procedure.

FIG. 15 is a message sequence chart illustrating another example procedure in which the CSP provides setup assistance for establishing a PDU session. The CSP, based on the deployed map of cloud resources, may determine the default settings for initial PDU session establishment for a WTRU. The default settings may indicate, for example, the DNN name, the user location, and/or the default DNN location where user plane traffic for a WTRU should be steered while setting up the PDU. The CSP may provide default options for the SMF (e.g., users from a particular registration area may use the DNN at a particular location ID to set up initial PDU sessions). At that point in time, it may not be known which SMF will be used. This option may be applicable for all SMFs. The default option may be to use cloud resources at the Registration area level.

The CSP may provide general guidance. An example of such guidance may be to indicate that all users subscribed to DNN=mycsp.com, at location="cell id, registration area", requesting an IPv4 PDU session, may use DNN at location="mno_abc". This information helps the AMF to select the SMF and assist the SMF in selecting the UPF. The SMF can also use this information to configure the UPF with classifiers. Selection of the AMF and SMF are 3GPP specific procedures. This information may be stored in a database, to be retrieved by the AMF if a WTRU requests establishment of a PDU session.

FIG. 15 describes two implementations of the procedure. For example, in option 1, the CSP may provide the information to a 3GPP Management system as shown in step 1510. The 3GPP management system may then update the UDM database at step 1520. As shown in option 2, the CSP may first provide the information to the NEF at step 1530, and the NEF may update the UDM database in step 1540. Option 2 may provide more flexibility and control to the CSP, and can be changed dynamically as network conditions change. After the initial configuration, and after providing default setup information to the 3GPP network, the CSP may subscribe for location updates and network information.

The CSP may begin monitoring network information including, for example, users' location, applications used by users, and network conditions. It may be assumed that the network operator provides this information through "Network Information Services". Network Information Services refers to all network related information, such as radio network information, core network information, user location and context information etc. For example, radio network information may include 51 bearer information, and/or radio access bearer (RAB) establishment information. Core network information may include delay, jitter, backhaul bandwidth etc. User location information may include, for example, cell IDs and/or registration areas corresponding to particular users. The CSP may use such data to reconfigure cloud resources and possibly move applications to a new DNN. This may be done for several reasons including load balancing, maintaining latency and/or bandwidth requirements. The new DNN may be closer or further away from the user. The CSP should be able to discover such services and authenticate to the 3GPP system before it can subscribe.

Figure 16:
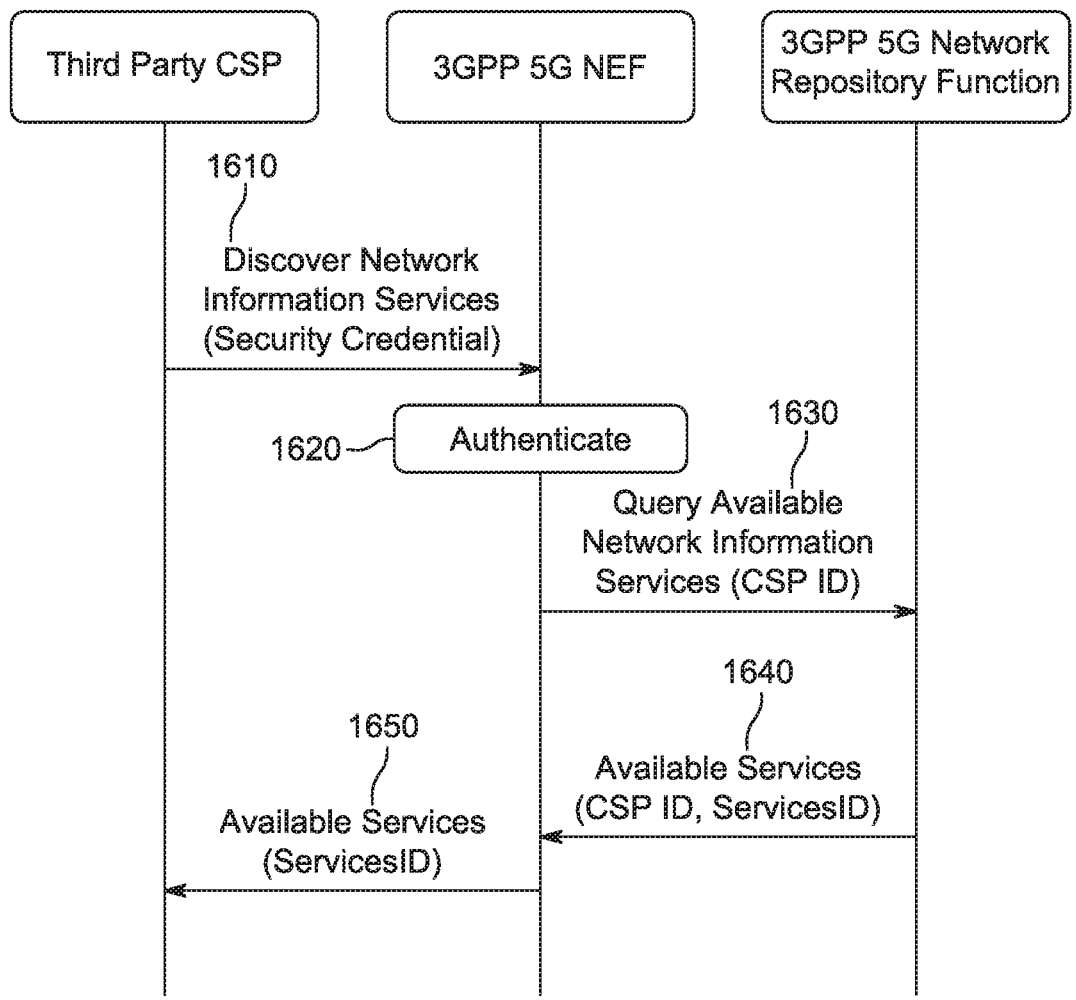
FIG. 16 is a message sequence chart illustrating example procedures for a discovery method.

FIG. 16 is a message sequence chart illustrating example procedures for such a discovery method. Discovery and authentication of network information service may be performed by the CSP and 3GPP Network Management System. In step 1610, the CSP may send a Discover_Network_Information_Services (Security_credential) message to the NEF, which may include security credentials. At step 1620, the NEF may authenticate the request and query the network Repository Function (NRF). At step 1630, the NEF may send a Query_Available_Network_Information_Services (CSP_ID) message with the CSP_ID to the NRF. In step 1640, the NRF may respond with an Available_Services (CSP_ID, ServicesID) message, which may include the CSP_ID of the requestor and a list of available services. At step 1650, the NEF may inform the CSP by sending an Available_Services (ServicesID) message to CSP. The response may include a list of service identifiers, which can be used by the CSP to subscribe to network information services.

The CSP may subscribe for desired network information services. The CSP can subscribe individually to each service or send a single subscribe request, which may include multiple subscriptions.

Figure 17:
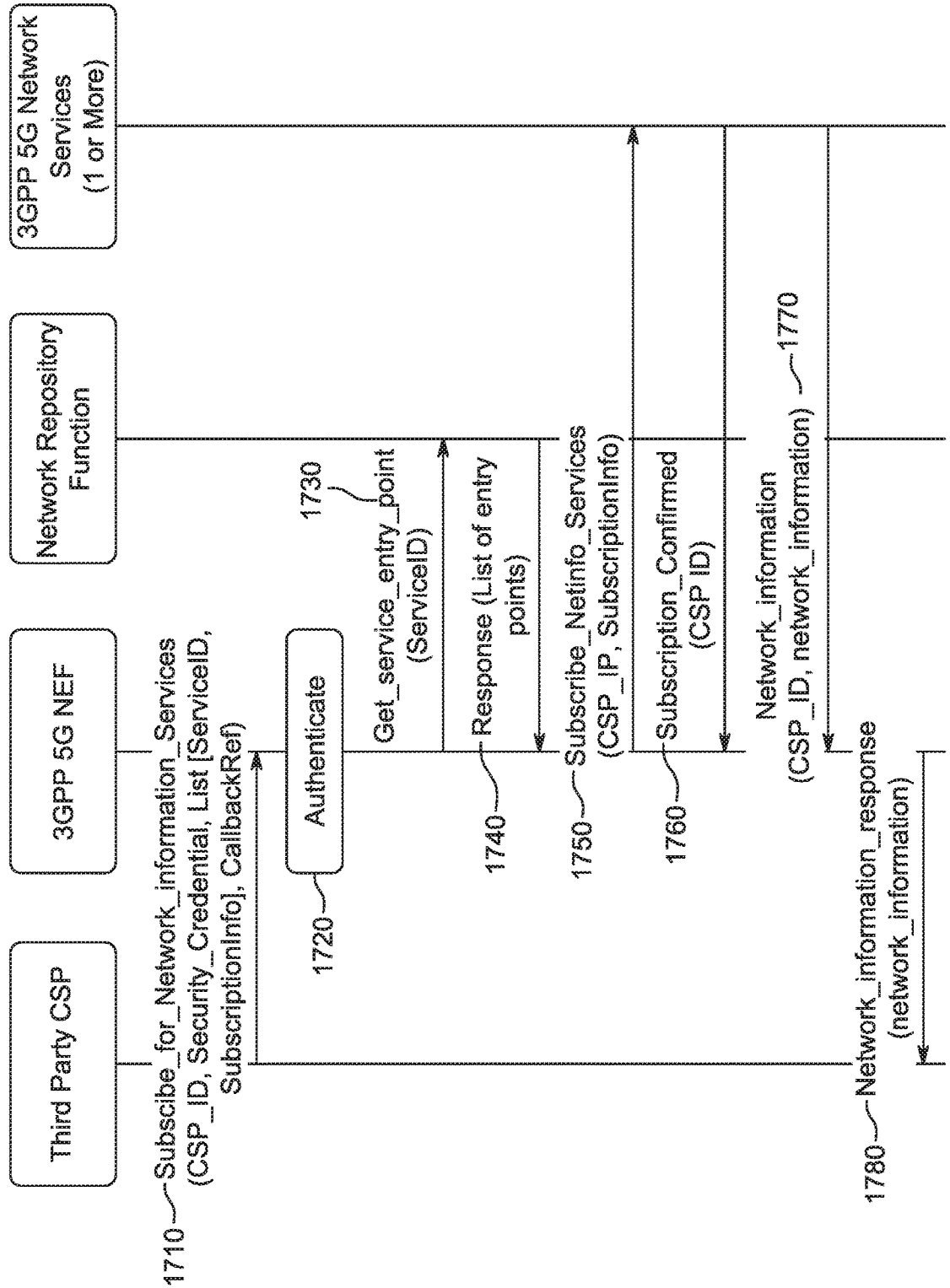
FIG. 17 is a message sequence chart which illustrates an example subscription procedure.

FIG. 17 is a message sequence chart illustrating an example of such a subscription procedure. As shown in step 1710, the CSP may send a Subscibe_for_Network_information_Services (CSP_ID, Security_credential, List [ServiceID, SubscriptionInfo], CallbackRef) message to the NEF, which may contain a CSP_ID, security credential, a list of services to which it wants to subscribe, and a callback reference. The call back reference may be used to notify the subscriber and provide the subscribed information. Network information services may provide various network information such as WTRU location information, radio network information, and/or core network information. These network information services may be owned and operated by the 3GPP network operator. A 3GPP network may provide location information and radio network information in a similar way as location service or RNIS in an ETSI MEC platform.

At step 1720, the NEF may authenticate the subscription request. The NEF may then query a Network Repository Function at step 1730 with Services ID to get the entry point for each service. Entry point to a service may be a simple URI, which can be accessed by other applications and services. At step 1730, the NEF may send a Get_service_entry_point (ServiceID) message to the NRF, which may respond by sending a response with the Entry_point, shown in step 1740. After this, the NEF may send a Subscribe_Netinfo_Services (CSP_ID, SubscriptionInfo) message to respective services, as shown in step 1750. A network information service may respond to the NEF with a Subscription_confirmed (CSP_ID confirmation message at step 1760. If the requested information is available, network information services may send the requested information to the NEF at step 1770 by sending a Network_information message. The Network_information message may include fields such as CSP_ID in addition to the network_information. The NEF may gather the received information and forward the information to the correct CSP at step 1780. This information may be sent, for instance, using the callback reference or in a message such as Network_information_response (network_information).

Depending on the service details and availability, the CSP may be interested in various information to manage cloud resources. The CSP can subscribe to receive this information and change/modify it as required. Examples of such information may include: location information for an individual WTRU; number of WTRUs in a given location; number of WTRUs using an Application ID in a given area; and/or a user traffic profile in a given area.

As discussed above, a CSP may be viewed as a consumer of network information. The CSP may collect network information and use that information to decide how to setup the correct UPF functions. By setting up a correct UPF function, user traffic may be routed to the edge applications running at the correct local DN.

Beyond this function, a CSP may also have the capability to process network information, run advanced analytics with information from other data sources to fine tune and optimize network settings. The CSP can help or complement RRM functionalities within the network. The CSP can monitor and predict security threats and take appropriate action such as blocking a user, tearing a connection, etc. Thus, the capability to set, modify and update network parameters dynamically/instantaneously by CSP may be desirable.

For example, the CSP and NEF may support the following APIs to set radio network information: Set_Overall_RNI (CSP_ID, radio_information), and/or Set_per_user_RNI (CSP_ID, User_Id, radio_information). The CSP and NEF may support the following APIs to set core network information: Set_Overall_CNI (CSP_ID, cn_information), Set_per_user_CNI (CSP_ID, User_Id, cn_information).

A CSP may monitor user information, such as the number of users who are using an edge application at a given location, and what the application requirements are in terms of latency, bandwidth, etc. at the given location. For example, at a specific location, N users may be using an edge application that requires X seconds of latency. The CSP may determine that these users are being served by an edge application running at the DNN, which was configured as a default, and the location of the DNN is at a higher level of POP. The CSP may decide to move the application, which is serving N number of users, to a DNN closer to the edge (e.g., EnB, AP, etc.). A CSP may inform the 3GPP network that for these users, this is the preferred user plane setup. This may indicate that, for these users, traffic may need to be steered towards the DNN located closer to the edge. The CSP may in this case identify to the 3GPP network the user plane related to Application ID/Flows, User ID, and/or the New DNN location. The CSP may also indicate to the edge applications that a possible relocation may occur.

Figure 18:
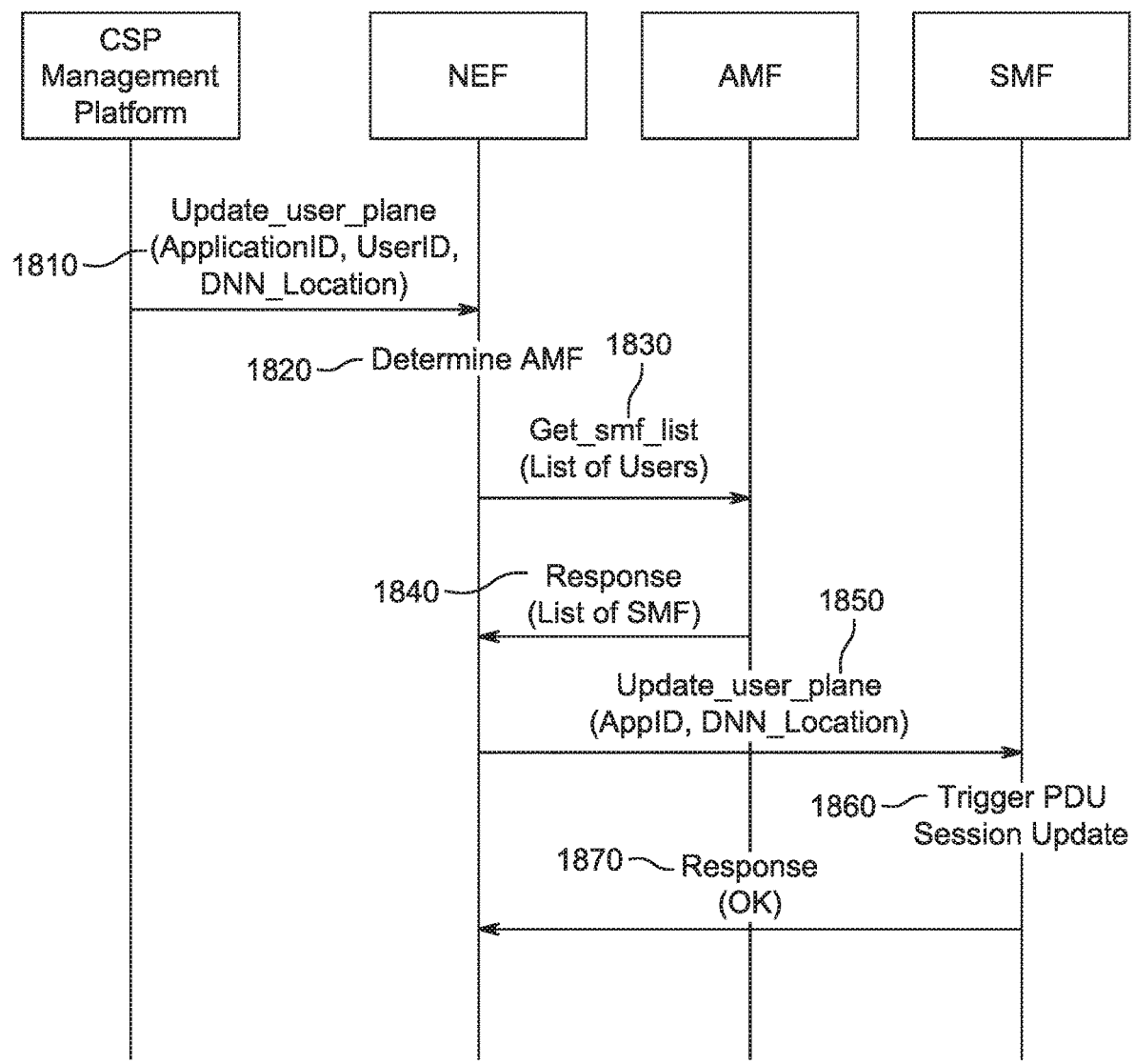
FIG. 18 is a message sequence chart illustrating a procedure to implement a first option for dynamic reconfiguration.

FIG. 18 is a message sequence chart illustrating a procedure to implement a first option for dynamic reconfiguration. In this example, the CSP initiates the procedure by sending an Update_user_plane (ApplicationID, UserID, DNN_Location) message to the NEF, shown at step 1810. At steps 1820 and 1830, the NEF may determine and query an appropriate AMF for a list of SMFs, which are handling the user sessions, and may do so by sending a query message, Get_smf_list (List of users). At step 1840, the AMF may return the list of SMF serving the users in a Response (List of SMF) message. At step 1850, the NEF may send an Update_user_plane (AppID, DNN_Location) message to the SMFs. The NEF may forward the AppID, DNN_Location information received from the CSP to the correct SMF. At steps 1860 and 1870, the SMFs may trigger a PDU session update based on the messages received and send responses to the NEF.

Figure 19:
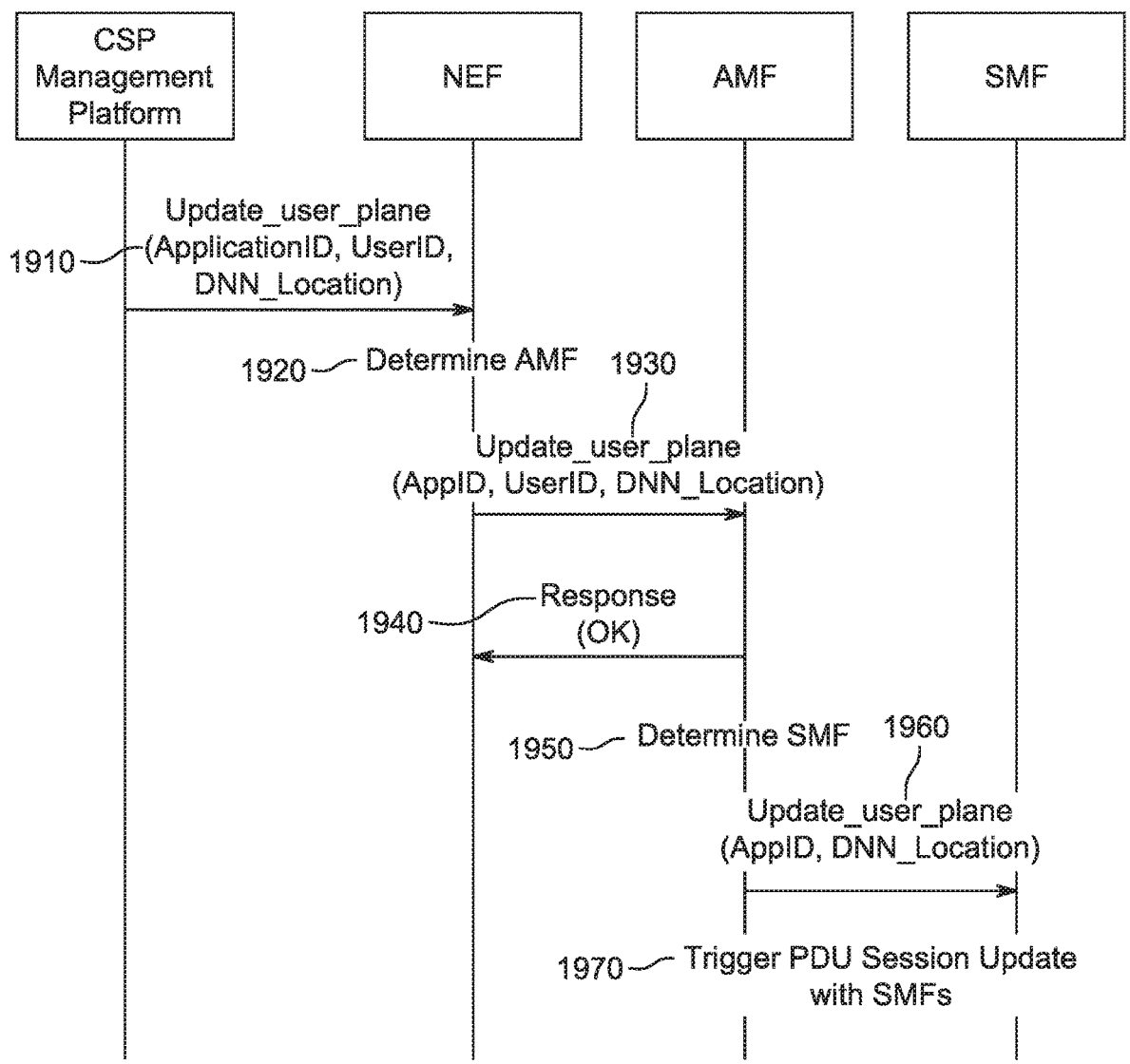
FIG. 19 is a message sequence chart illustrating a procedure to implement a second option for dynamic reconfiguration.

FIG. 19 is a message sequence chart illustrating a procedure to implement a second option for dynamic reconfiguration. The CSP may initiate the procedure by sending an Update_user_plane (ApplicationID, UserID, DNN_Location) message to the NEF, as shown at step 1910. In this alternative, after determining the appropriate AMF in step 1920, the NEF may send all the information to the AMF, e.g., by sending an Update_user_plane (UserId, AppID, DNN_location) message, as shown in step 1930. At step 1940, the AMF may return a response (OK) acknowledging receipt of the message. At step 1950, the AMF may determine the list of SMF serving the list of WTRUs and, at step 1960, send an Update_user_plane (AppID, DNN_Location) message to all SMFs. At step 1970, the AMF may trigger a PDU session update with multiple SMFs.

Figure 20:
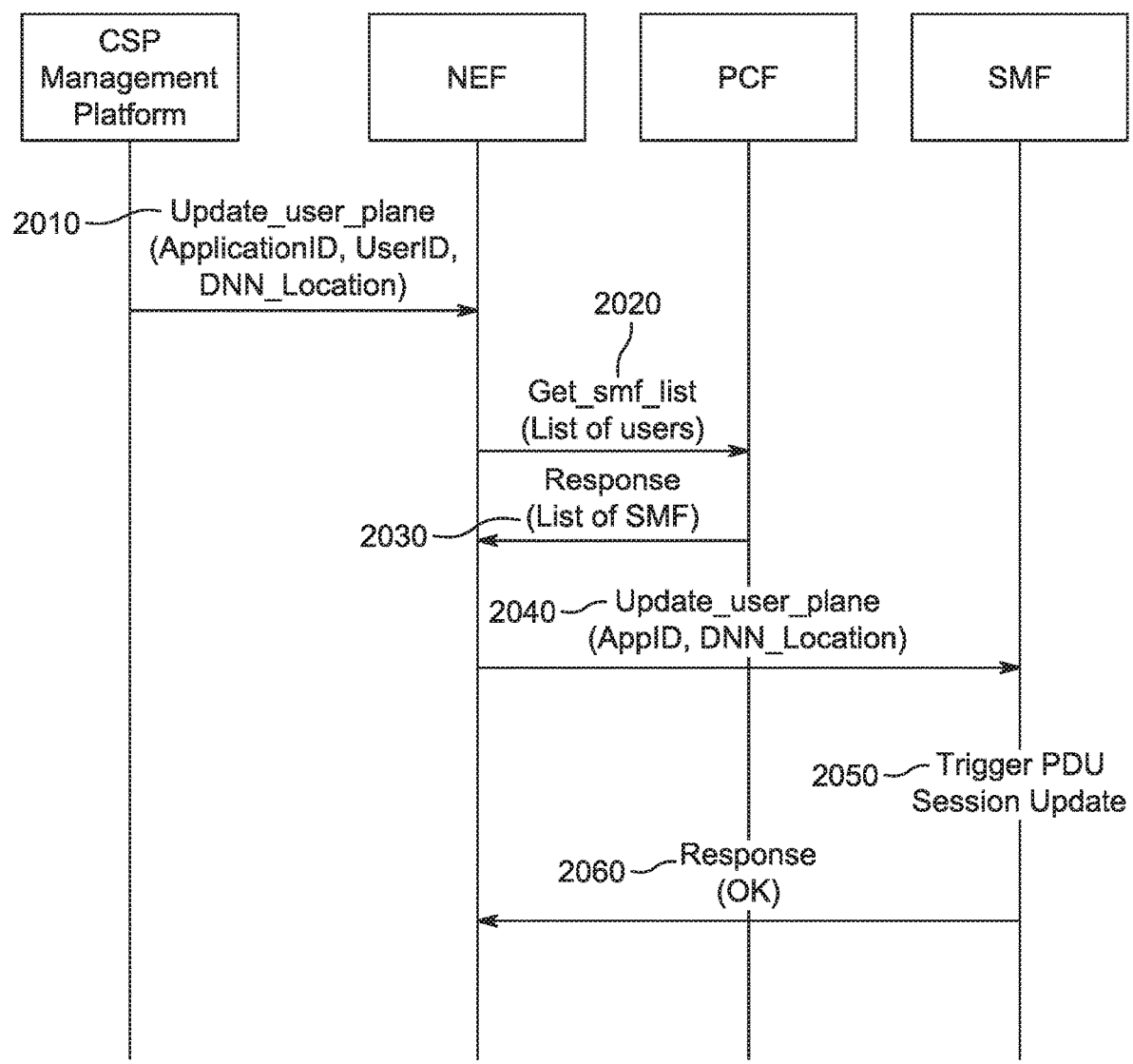
FIG. 20 is a message sequence chart illustrating a procedure to implement a third option for dynamic reconfiguration.

FIG. 20 is a message sequence chart illustrating a procedure to implement a third option for dynamic reconfiguration. The CSP may initiate the procedure by sending an Update_user_plane (ApplicationID, UserID, DNN_Location) message to the NEF, as shown at step 2010. In this alternative, the NEF may query the PCF to obtain information about a relevant SMF by sending a Get_smf_list (List of users) message, shown at step 2020. It may be assumed that the PCF has all the relevant information about users and the SMFs managing the user plane etc. Once the NEF obtains the list of relevant SMFs as in step 2030, may send an Update_user_plane (AppID, DNN_Location) message to all the SMFs, shown at step 2040.

For N users, there may be more than one (e.g., N) SMFs handling the sessions. Here it is assumed that either NEF or AMF sends N messages to N SMFs. Based on the AppID, the SMF may identify the PDU session that needs to be modified. At step 2050, after the PDU session has been identified, the SMF triggers a PDU session modification. This may include a new UPF with a classifier function, which may be able to steer the user plane traffic to the new DNN. At step 2060, the SMF may send a response to the NEF.

Figure 21:
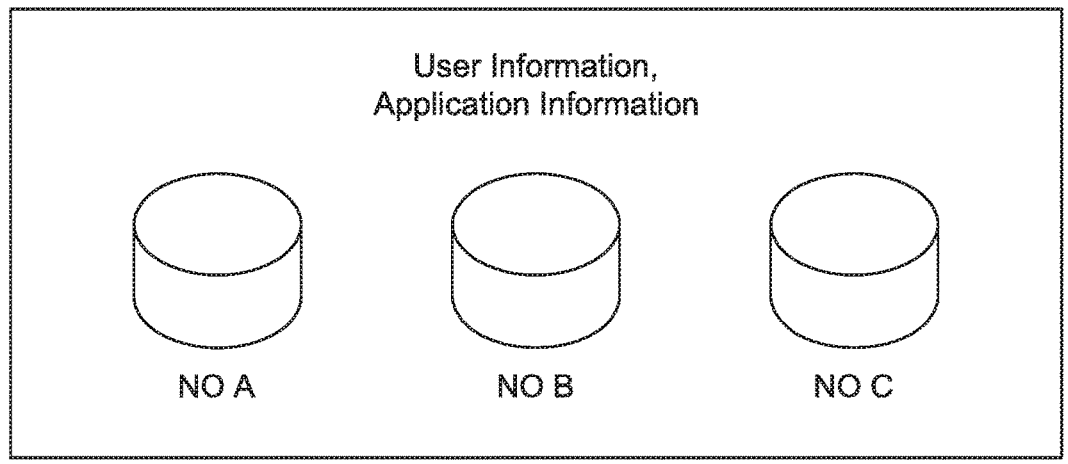
FIG. 21 is a block diagram illustrating CSP cloud services as neutral host and providing edge service for more than one network operator.

CSP cloud services can act as neutral host and provide edge service for more than one network operator. FIG. 21 is a block diagram illustrating a simple scenario. Here it may be assumed that CSP interacts with the NEF of each network operator. This is a simple case, where CSP maintains information per Network Operator (NO) and interacts with independent NEF.

Figure 22:
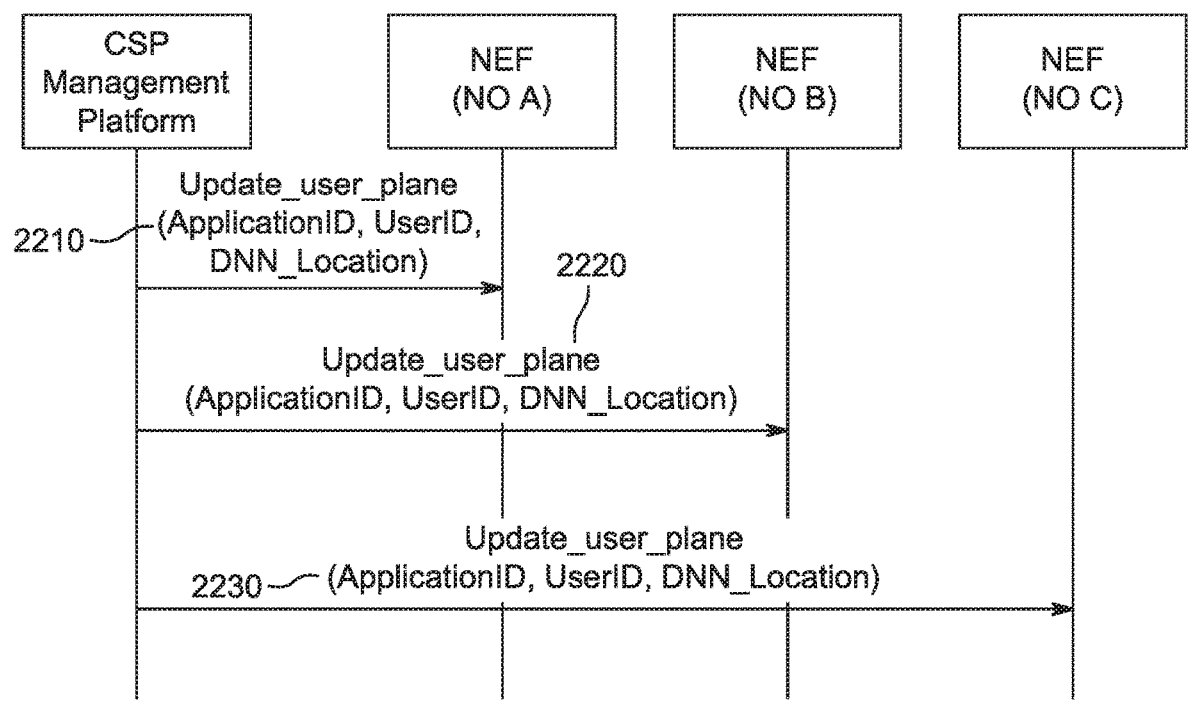
FIG. 22 is a message sequence chart illustrating CSP interaction with an NEF from each network operator.

FIG. 22 is a message sequence chart illustrating CSP interaction with an NEF from multiple NOs. As in FIGS. 18-20, the CSP may initiate dynamic reconfiguration procedures separately with NEFs for each NO. The CSP may send Update_user_plane (ApplicationID, UserID, DNN_Location) messages to each NEF, as shown in steps 2210, 2220, and 2230. In scenarios in which a single network may host many virtual network operators, the CSP may also include the MVNO identity in the APIs it is requesting. For example, the previous API to modify PDU session may be updated with MVNO ID, Update_user_plane (NVNO_ID, ApplicationID, UserID, DNN_Location).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a network exposure function (NEF), the method comprising:

receiving a message from a cloud service provider (CSP) to subscribe for information associated with at least one wireless transmit/receive unit (WTRU), wherein the information includes location information of the at least one WTRU, a number of the at least one WTRU in a location, or a number of the at least one WTRU using an application in a location;

transmitting the information associated with the at least one WTRU to the CSP;

receiving an update user plane message from the CSP, the update user plane message including a data network name (DNN) location to enable the NEF to steer a user plane (UP) associated with the at least one WTRU; and steering the UP associated with the at least one WTRU based on the update user plane message received from the CSP including the DNN location, wherein steering the UP further comprises:

querying a core network access and mobility function (AMF) for at least one session management function (SMF) serving the at least one WTRU;

receiving an indication of the at least one SMF from the AMF; and sending a message to the at least one SMF, wherein the message includes an application identifier, an identifier associated with the WTRU, and the DNN location;

wherein the message is an indication to update the UP associated with the at least one WTRU.

2. The method of claim 1, wherein steering the UP further comprises:

sending a message to an AMF, wherein the message includes an application identifier, an identifier associated with the WTRU, and the DNN location;

wherein the message is an indication to trigger one or more SMFs to update the UP associated with the at least one WTRU.

3. The method of claim 1, wherein steering the UP further comprises:

querying a policy control function (PCF) for at least one session management function (SMF) serving the at least one WTRU;

receiving an indication of the at least one SMF from the PCF; and sending a message to the at least one SMF, wherein the message includes an application identifier, an identifier associated with the WTRU, and the DNN location information;

wherein the message is an indication to update a user plane.

4. The method of claim 1, wherein the NEF communicates with the CSP via an application programming interface (API).

5. The method of claim 4, wherein the NEF is co-located with a gNB.

6. The method of claim 1, wherein the NEF is located in a customer premises equipment (CPE).

7. The method of claim 1, wherein the NEF is located in a mobile network operator (MNO) core network (CN).

8. A network exposure function (NEF) comprising:

a receiver configured to receive a message from a cloud service provider (CSP) to subscribe for information associated with at least one wireless transmit/receive unit (WTRU), wherein the information includes location information of the at least one WTRU, a number of the at least one WTRU in a location, or a number of the at least one WTRU using an application in a location;

a processor configured to retrieve the information associated with the at least one WTRU; and a transmitter configured to transmit the information associated with the at least one WTRU to the CSP;

query a core network access and mobility function (AMF) for at least one session management function (SMF) serving the at least one WTRU;
receive an indication of the at least one SMF from the AMF; and
send a message to the at least one SMF;
wherein the receiver is further configured to receive an update user plane message from the CSP, the update user plane message including a data network name (DNN) location to enable the NEF to steer a user plane (UP) associated with the at least one WTRU;
wherein the processor and transmitter are further configured to steer the UP associated with the at least one WTRU based on the update user plane message received from the CSP including the DNN location wherein the message includes an application identifier, an identifier associated with the at least one WTRU, and the DNN location; and
wherein the message is an indication to update the UP associated with the at least one WTRU.

9. The NEF of claim 8, further configured to:
send a message to an AMF, wherein the message includes an application identifier, an identifier associated with the at least one WTRU, and the DNN location;
wherein the message is an indication to trigger one or more SMFs to update the UP associated with the at least one WTRU.

10. The NEF of claim 8, further configured to:
query a policy control function (PCF) for at least one session management function (SMF) serving the at least one WTRU;
receive an indication of the at least one SMF from the PCF; and
send a message to the at least one SMF, wherein the message includes an application identifier, an identifier associated with the WTRU, and the DNN location information;
wherein the message is an indication to update a user plane.

11. The NEF of claim 8, further configured to communicate with the CSP via an application programming interface (API).

12. The NEF of claim 8, wherein the NEF is located in a customer premises equipment (CPE).

13. The NEF of claim 8, wherein the NEF is located in a mobile network operator (MNO) core network (CN).

14. The NEF of claim 13, wherein the NEF is co-located with a gNB.

15. A method for use by a cloud service provider (CSP), the method comprising:
sending a message to a network exposure function (NEF) to subscribe for information associated with at least one wireless transmit/receive unit (WTRU), wherein the information includes location information of the at least one WTRU, a number of the at least one WTRU in a location, or a number of the at least one WTRU using an application in a location;
the CSP, based on the received information, determining to update a user plane (UP) associated with the at least one WTRU;
the CSP transmitting an update user plane message to the NEF, the update user plane message including a data network name (DNN) location to enable the NEF to steer the UP associated with the at least one WTRU, the NEF being further configured to:
query a policy control function (PCF) for at least one session management function (SMF) serving the at least one WTRU;
receive an indication of the at least one SMF from the PCF; and
send a message to the at least one SMF, wherein the message includes an application identifier, an identifier associated with the WTRU, and the DNN location information; and
wherein the message is an indication to update a user plane.

16. The method of claim 15, wherein the CSP is a third-party CSP.

17. The method of claim 15, wherein the CSP is a mobile network operator (MNO).

18. The method of claim 15, wherein the CSP communicates with the NEF via an application programming interface (API).

* * * * *